US012628170B2

(12) United States Patent
Zhao

(10) Patent No.: US 12,628,170 B2
(45) Date of Patent: May 12, 2026

(54) METHOD FOR PHYSICAL UPLINK CONTROL CHANNEL TRANSMISSION, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Nande Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 305 days.

(21) Appl. No.: 18/496,433

(22) Filed: Oct. 27, 2023

(65) Prior Publication Data

US 2024/0064749 A1 Feb. 22, 2024

Related U.S. Application Data

(63) Continuation of application No. PCT/CN2021/103442, filed on Jun. 30, 2021.

(51) Int. Cl.
| | |
|---|---|
| *H04W 72/21* | (2023.01) |
| *H04L 5/00* | (2006.01) |
| *H04L 27/26* | (2006.01) |
| *H04W 72/0457* | (2023.01) |

(52) U.S. Cl.
CPC ........... *H04W 72/21* (2023.01); *H04L 5/0053* (2013.01); *H04L 27/2607* (2013.01); *H04W 72/0457* (2023.01)

(58) Field of Classification Search
CPC ............ H04W 72/21; H04W 72/0457; H04L 5/0053; H04L 27/2607
See application file for complete search history.

(56) References Cited

U.S. PATENT DOCUMENTS

| 12,245,177 B2 * | 3/2025 | He | H04W 56/0015 |
| 2023/0254868 A1 * | 8/2023 | Hou | H04L 5/0058 |
| | | | 370/329 |

FOREIGN PATENT DOCUMENTS

| CN | 106162888 | 11/2016 |
| CN | 111901870 | 11/2020 |
| CN | 112242892 | 1/2021 |
| EP | 3537818 | 9/2019 |
| WO | 2020146643 | 7/2020 |

OTHER PUBLICATIONS

EPO, Partial Supplementary European Search Report for EP Application No. 21947516.7, Apr. 22, 2024.
EPO, Extended European Search Report for EP Application No. 21947516.7, Jul. 15, 2024.

(Continued)

*Primary Examiner* — Chandrahas B Patel
(74) *Attorney, Agent, or Firm* — Hodgson Russ LLP

(57) ABSTRACT

A method for wireless communication, a terminal device, and a network device are provided. The method for wireless communication includes the following. The terminal device determines a physical resource block (PRB) position of a target PUCCH resource for a PUCCH in an initial uplink BWP, where the target PUCCH resource includes at least one PRB per hop unit. The terminal device transmits the PUCCH on the target PUCCH resource.

18 Claims, 11 Drawing Sheets

INITIAL UPLINK BWP

| | $N_{RB}$ | $N_{RB}$ | $N_{RB}$ | $N_{RB}$ | | $N_{RB}$ | $N_{RB}$ | $N_{RB}$ | $N_{RB}$ |
|---|---|---|---|---|---|---|---|---|---|
| FIRST HOP UNIT | $r_{PUCCH}=0,1$ | $r_{PUCCH}=2,3$ | $r_{PUCCH}=4,5$ | $r_{PUCCH}=6,7$ | ... | $r_{PUCCH}=14,15$ | $r_{PUCCH}=12,13$ | $r_{PUCCH}=10,11$ | $r_{PUCCH}=8,9$ |
| SECOND HOP UNIT | $r_{PUCCH}=8,9$ | $r_{PUCCH}=10,11$ | $r_{PUCCH}=12,13$ | $r_{PUCCH}=14,15$ | ... | $r_{PUCCH}=6,7$ | $r_{PUCCH}=4,5$ | $r_{PUCCH}=2,3$ | $r_{PUCCH}=0,1$ |

FIRST PRB INDEX

SECOND PRB INDEX

(56)          References Cited

OTHER PUBLICATIONS

"3rd Generation Partnership Project; Technical Specification Group Radio Access Network; NR; Physical layer procedures for control (Release 16)," 3GPP TS 38.213, Mar. 2021, v16.5.0.
"Broadband Radio Access Networks (BRAN); 60 GHz Multiple-Gigabit WAS/RLAN Systems; Harmonized EN covering the essential requirements of article 3.2 of the R&TTE Directive," ETSI EN 302 567, Jan. 2012, v1.2.1.
VIVO, "Discussions on PUCCH enhancements for NR operation from 52.6GHz to 71GHz," 3GPP TSG RAN WG1 #105-e, R1-2104349, May 2021.
Nokia et al., "Enhanced PUCCH formats 0/1/4," 3GPP TSG RAN WG1 #105, R1-2104453, May 2021.
Ericsson, "Enhancements for PUCCH formats 0/1/4," 3GPP TSG-RAN WG1 Meeting #105-e, Tdoc R1-2104461, May 2021.

Qualcomm Incorporated, "Enhancement for PUCCH format 0/1/4 for NR operations in unlicensed 60GHz band," 3GPP TSG-RAN WG1 #105e, R1-2104660, May 2021.
ZTE et al., "Discussion on the PUCCH enhancements for 52.6 to 71 GHz," 3GPP TSG RAN WG1 #105-e, R1-2104834, May 2021.
Intel Corporation, "Discussion on PUCCH Format 0/1/4 Enhancements for NR up to 71 GHz," 3GPP TSG RAN WG1 Meeting #105-e, R1-2104895, May 2021.
LG Electronics, "Enhancements for PUCCH formats 0/1/4 to support NR above 52.6 GHz," 3GPP TSG RAN WG1 #105-e, R1-2105420, May 2021.
VIVO, "Discussions on PUCCH enhancements for NR operation from 52.6GHz to 71GHz," 3GPP TSG RAN WG1 #105-e, R1-2106065, May 2021.
WIPO, International Search Report and Written Opinion for International Application No. PCT/CN2021/103442, Dec. 24, 2021.

* cited by examiner

100

120    110    120

200

TERMINAL DEVICE DETERMINES PRB POSITION OF TARGET PUCCH RESOURCE FOR PUCCH IN INITIAL UPLINK BWP, WHERE TARGET PUCCH RESOURCE INCLUDES AT LEAST ONE PRB PER HOP UNIT

S210

TERMINAL DEVICE TRANSMITS PUCCH ON TARGET PUCCH RESOURCE

S220

INITIAL UPLINK BWP = 160 RBs

FIRST HOP UNIT:

| 34 RBs | 34 RBs | 34 RBs | 34 RBs | 24 RBs |
|---|---|---|---|---|
| $r_{PUCCH} = 0,1$ | $r_{PUCCH} = 2,3$ | $r_{PUCCH} = 4,5$ | $r_{PUCCH} = 6,7$ | $r_{PUCCH} = 8,9$ |

SECOND HOP UNIT:

| $r_{PUCCH} = 8,9$ | $r_{PUCCH} = 6,7$ | $r_{PUCCH} = 4,5$ | $r_{PUCCH} = 2,3$ | $r_{PUCCH} = 0,1$ |

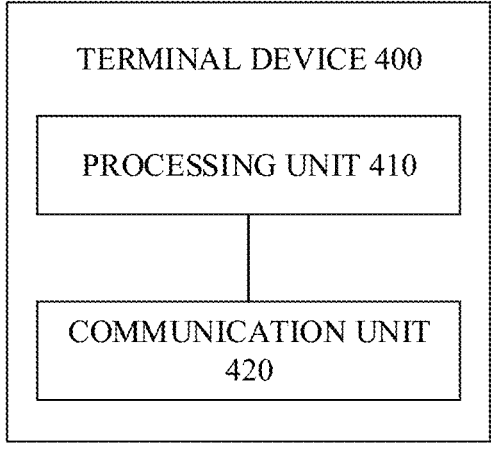
FIG. 16
NETWORK DEVICE 500
COMMUNICATION UNIT
510
FIG. 17
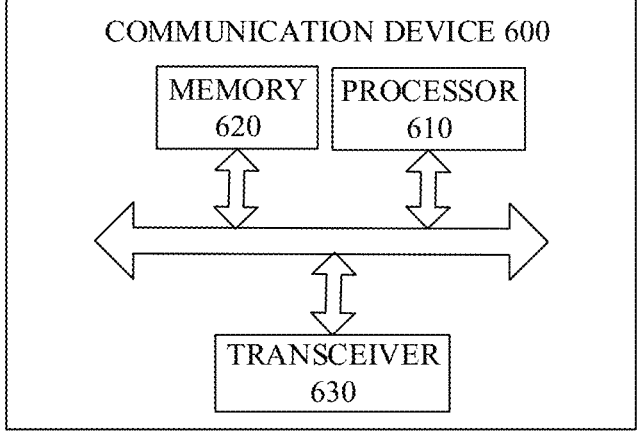
FIG. 18

METHOD FOR PHYSICAL UPLINK CONTROL CHANNEL TRANSMISSION, TERMINAL DEVICE, AND NETWORK DEVICE

CROSS-REFERENCE TO RELATED APPLICATION(S)

This application is a continuation of International Application No. PCT/CN2021/103442, filed Jun. 30, 2021, the entire disclosure of which is hereby incorporated by reference.

TECHNICAL FIELD

This disclosure relates to the field of communication, and more specifically to a method for wireless communication, a terminal device, and a network device.

BACKGROUND

Uplink transmission is generally limited by a maximum power spectral density (PSD) and a maximum equivalent isotropically radiated power (EIRP). Currently, it can merely support transmission of physical uplink control channel (PUCCH) formats 0/1/4 on only one physical resource block (PRB), resulting in limited coverage of a PUCCH transmission.

SUMMARY

A method for wireless communication, a terminal device, and a network device are provided in embodiments of the disclosure.

In a first aspect, a method for wireless communication is provided. The method includes the following. A terminal device determines a physical resource block (PRB) position of a target PUCCH resource for a PUCCH in an initial uplink bandwidth part (BWP), where the target PUCCH resource includes at least one PRB per hop unit. The terminal device transmits the PUCCH on the target PUCCH resource.

In a second aspect, a terminal device is provided. The terminal device includes a transceiver, a processor coupled to the transceiver, and a memory configured to store a computer program. The computer program is executed by the processor to cause the terminal device to perform the following. The terminal device determines a PRB position of a target PUCCH resource for a PUCCH in an initial uplink BWP, where the target PUCCH resource includes at least one PRB per hop unit. The terminal device transmits the PUCCH on the target PUCCH resource.

In a third aspect, a network device is provided. The network device includes a transceiver, a processor coupled to the transceiver, and a memory configured to store a computer program. The computer program is executed by the processor to cause the network device to perform the following. The network device transmits indication information to a terminal device, where the indication information indicates M PUCCH resources in a target PUCCH resource set, the M PUCCH resources include a target PUCCH resource, the target PUCCH resource includes at least one PRB per hop unit, M is a positive integer and M≤K, and K is the number of PUCCH resources in a PUCCH resource set as defined in a protocol. The network device receives a PUCCH transmitted on the target PUCCH resource by the terminal device.

Other features and aspects of the disclosed features will become apparent from the following detailed description, taken in conjunction with the accompanying drawings, which illustrate, by way of example, the features in accordance with implementations the disclosure. The summary is not intended to limit the scope of any implementations described herein.

BRIEF DESCRIPTION OF THE DRAWINGS

FIG. 16 is a schematic block diagram of a terminal device according to embodiments of the disclosure.

FIG. 17 is a schematic block diagram of a network device according to embodiments of the disclosure.

FIG. 18 is a schematic block diagram of a communication device according to embodiments of the disclosure.

DETAILED DESCRIPTION

Figure 1:
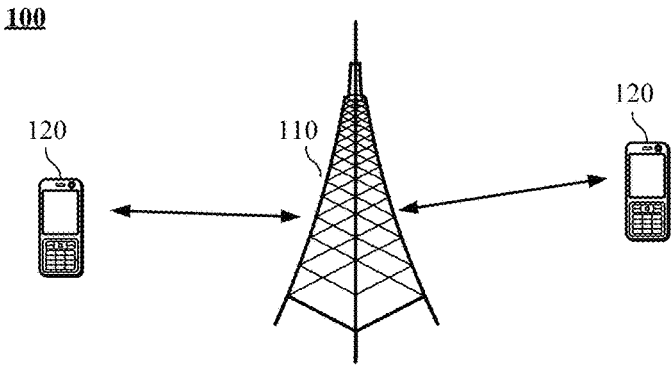
FIG. 1 is a schematic architectural diagram of a communication system to which embodiments of the disclosure are applied.

The following will describe technical solutions of embodiments of the disclosure with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

Technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th-generation (5G) communication system, or other communication systems, etc.

Generally speaking, a conventional communication system supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Embodiments of the disclosure can also be applied to these communication systems.

Optionally, the communication system in embodiments of the disclosure may be applied to a carrier aggregation (CA) scenario, or may be applied to a dual connectivity (DC) scenario, or may be applied to a standalone (SA) network deployment scenario.

Optionally, the communication system in embodiments of the disclosure is applicable to an unlicensed spectrum, and an unlicensed spectrum may be regarded as a shared spectrum. Alternatively, the communication system in embodiments of the disclosure is applicable to a licensed spectrum, and a licensed spectrum may be regarded as a non-shared spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In embodiments of the disclosure, the terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.).

In embodiments of the disclosure, the terminal device may be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in embodiments of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in a WLAN, a base transceiver station (BTS) in GSM or CDMA, may also be a Node B (NB) in WCDMA, or may be an evolutional Node B (eNB or eNodeB), or a relay state or an AP, or an in-vehicle device, or a wearable device in LTE, or a base station (gNB) in an NR network, a network device in a future evolved PLMN, or a network device in an NTN, etc.

By way of explanation rather than limitation, in embodiments of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In embodiments of the disclosure, the network device serves a cell, and the terminal device communicates with the network device through a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are suitable for providing data transmission service with high-rate.

Exemplarily, FIG. 1 illustrates a communication system 100 to which embodiments of the disclosure are applied. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Alternatively, the communication system 100 may include multiple network devices, and there can be other quantities of terminal devices in a coverage area of each of the network devices. Embodiments of the disclosure are not limited in this regard.

Optionally, the communication system 100 may further include other network entities such as a network controller, a mobile management entity, or the like, and embodiments of the disclosure are not limited in this regard.

It is to be understood that, in embodiments of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and embodiments of the disclosure are not limited in this regard.

It is to be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that associated objects are in an "or" relationship.

It is to be understood that, "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of embodiments of the disclosure, the term "correspondence" may mean that there is a direct or indirect correspondence between the two, may mean that there is an association between the two, or may mean a relationship of indicating and being indicated or configuring and being configured, etc.

In embodiments of the disclosure, the "pre-defined" or "pre-configured" can be implemented by pre-storing a corresponding code(s) or a corresponding table(s) in a device (for example, including the terminal device and the network device) or in other manners that can be used for indicating related information, and the disclosure is not limited in this regard. For example, the "pre-defined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

For better understanding of technical solutions of embodiments of the disclosure, the technical solutions of embodiments of the disclosure will be elaborated first. The related art below, as an optional scheme, can be arbitrarily combined with the technical solutions of embodiments of the disclosure, which shall all belong to the protection scope of the disclosure. Embodiments of the disclosure include at least some of the following.

For better understanding of technical solutions of embodiments of the disclosure, determination of a physical uplink control channel (PUCCH) resource in a radio resource control (RRC)_CONNECTED state will be described in the following.

In the RRC_CONNECTED state, a base station configures for a UE up to four PUCCH resource sets via higher-layer RRC signaling, and the PUCCH resource sets are respectively used to carry uplink control information (UCI) of various payload sizes. A first PUCCH resource set is used to carry UCI of up to 2 bits and is widely used during system operation. Therefore, the first PUCCH resource set can be configured with up to 32 PUCCH resources, so as to ensure that all the UEs in a system can be allocated with PUCCH resources required.

Mapping of values of a PUCCH resource indicator field in downlink control information (DCI) to a PUCCH resource in a PUCCH resource set is defined as illustrated in Table 1, where when the PUCC resource indicator field includes 3 bits, values of the 3 bits map to eight PUCCH resources, respectively.

TABLE 1

| PUCCH resource indicator | | | |
| --- | --- | --- | --- |
| 1 bit | 2 bits | 3 bits | PUCCH resource |
| '0' | '00' | '000' | 1st PUCCH resource provided by pucch-ResourceId obtained from the 1st value of resourceList |
| '1' | '01' | '001' | 2nd PUCCH resource provided by pucch-ResourceId obtained from the 2nd value of resourceList |
| | '10' | '010' | 3rd PUCCH resource provided by pucch-ResourceId obtained from the 3rd value of resourceList |
| | '11' | '011' | 4th PUCCH resource provided by pucch-ResourceId obtained from the 4th value of resourceList |
| | | '100' | 5th PUCCH resource provided by pucch-ResourceId obtained from the 5th value of resourceList |
| | | '101' | 6th PUCCH resource provided by pucch-ResourceId obtained from the 6th value of resourceList |
| | | '110' | 7th PUCCH resource provided by pucch-ResourceId obtained from the 7th value of resourceList |
| | | '111' | 8th PUCCH resource provided by pucch-ResourceId obtained from the 8th value of resourceList |

When the PUCCH resource indicator field includes 1 bit or 2 bits, the values of the PUCCH resource indicator field map to the first two values or the first four values, respectively, of Table 1, i.e., the first two PUCCH resources or the first four PUCCH resources, respectively, of Table 1.

When the number (quantity) of PUCCH resources configured for the first PUCCH resource set, $R_{PUUCH}$, is larger than eight, the UE can determine a PUCCH resource with index $r_{PUCCH}$, where $0 \leq r_{PUCCH} \leq R_{PUUCH}-1$, and $r_{PUCCH}$ is determined based on the PUCCH resource indicator field of 3 bits, additional parameters, and the following formula 1:

$$r_{PUCCH} = \begin{cases} \left\lfloor \dfrac{n_{CCE,p} \cdot \lceil R_{PUCCH}/8 \rceil}{N_{CCE,P}} \right\rfloor + \Delta_{PRI} \cdot \left\lceil \dfrac{R_{PUCCH}}{8} \right\rceil & \Delta_{PRI} < R_{PUCCH} \bmod 8 \\ \left\lfloor \dfrac{n_{CCE,p} \cdot \lceil R_{PUCCH}/8 \rceil}{N_{CCE,P}} \right\rfloor + & \\ \Delta_{PRI} \cdot \left\lceil \dfrac{R_{PUCCH}}{8} \right\rceil + R_{PUCCH} \bmod 8 & \Delta_{PRI} < R_{PUCCH} \bmod 8 \end{cases}$$

$N_{CCE,P}$ is the number of control channel elements (CCEs) in control resource set (CORESET)p for DCI, $b_{CCE,p}$ is an index of a first CCE for the DCI, $\Delta_{PRI}$ is a value of the PUCCH resource indicator field in the DCI, $\lfloor \ \rfloor$ represents a floor function, $\lceil \ \rceil$ represents a ceiling function, and mod represents a modulo operation.

For better understanding of technical solutions of embodiments of the disclosure, determination of a PUCCH resource in an initial access phase will be described in the following.

Prior to RRC connection establishment, the UE cannot obtain PUCCH resource configuration via higher-layer RRC signaling. Therefore, 16 common PUCCH resource sets for an initial uplink bandwidth part (BWP) are pre-defined as illustrated in Table 2, where each row in Table 2 is located through an index, i.e., each PUCCH resource set corresponds to a row of Table 2.

TABLE 2

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | (0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Each of the multiple PUCCH resource sets pre-defined contains 16 PUCCH resources, and each PUCCH resource corresponds to a PUCCH format, a first symbol, the number of symbols, a physical resource block (PRB) offset, and a cyclic shift (CS) for multi-user multiplexing.

It is to be noted that, prior to RRC connection establishment, a PUCCH is merely used to feed back hybrid automatic repeat request acknowledgement (HARQ-ACK) information during initial access, and thus is merely required to carry control information of 1 or 2 bits. Therefore, PUCCH resources in the PUCCH resource set pre-defined merely include PUCCH format 0 and PUCCH format 1.

Based on Table 2 above, the base station first configures for the UE one common PUCCH resource set via system information (e.g., system information block 1 (SIB1)) before RRC connection establishment. Prior to RRC connection establishment, when the UE needs to feed back HARQ-ACK information using a PUCCH, the UE needs to further determine a PUCCH resource with index $r_{PUCCH}$, where $0 \leq r_{PUCCH} \leq 15$, and $r_{PUCCH}$ corresponds to 16 PUCCH resources in each PUCCH resource set and is determined based on the following formula 2.

$$r_{PUCCH} = \left\lfloor \frac{2 \cdot n_{CCE,0}}{N_{CCE}} \right\rfloor + 2 \cdot \Delta_{PRI} \qquad \text{formula 2}$$

$N_{CCE}$ is the number of CCEs in a CORESET for DCI, $n_{CCE,0}$ is an index of a first CCE for the DCI, $\Delta_{PRI}$ is a value of the PUCCH resource indicator field in the DCI, and $\lfloor \rfloor$ represents a floor function.

When index $r_{PUCCH}$ of a PUCCH resource is determined, the UE can determine a PRB index of a PUCCH transmission in the initial access phase.

When $\lfloor r_{PUUCH}/8 \rfloor = 0$, a PRB index of the PUCCH transmission in a first hop unit is $$RB_{BWP}^{offset} + \lfloor r_{PUCCH}/N_{CS} \rfloor,$$

and a PRB index of the PUCCH transmission in a second hop unit is $$N_{BWP}^{size} - 1 - RB_{BWP}^{offset} - \lfloor r_{PUCCH}/N_{CS} \rfloor,$$

where $N_{CS}$ is the number of initial CS indexes in a set of initial CS indexes. In this case, code-division multiplexing of $N_{CS}$ users on the same frequency resource can be implemented.

$$RB_{BWP}^{offset}$$

is a PRB offset for the initial uplink BWP, $$N_{BWP}^{size}$$

is the number of PRBs in the initial uplink BWP, and $\lfloor \rfloor$ represents a floor function.

When $\lfloor r_{PUUCH}/8 \rfloor = 1$, the PRB index of the PUCCH transmission in the first hop unit is $$N_{BWP}^{size} - 1 - RB_{BWP}^{offset} - \lfloor (r_{PUUCH} - 8)/(N_{CS}) \rfloor,$$

and the PRB index of the PUCCH transmission in the second hop unit is $$RB_{BWP}^{offset} + \lfloor (r_{PUUCH} - 8)/(N_{CS}) \rfloor.$$

It is to be noted that, when frequency hopping has been configured for a PUCCH with L symbols, the number of orthogonal frequency-division multiplexing (OFDM) symbols in the first hop unit is $\lfloor L/2 \rfloor$, and the number of OFDM symbols in the second hop unit is $L - \lfloor L/2 \rfloor$. By means of maximizing an interval between a PRB for a PUCCH transmission in the first hop unit and a PRB for the PUCCH transmission in the second hop unit, a maximum frequency diversity gain can be obtained through frequency hopping.

In addition, for different PUCCHs code-division multiplexing is performed by means of initial CS indexes, and thus when a PRB for a PUCCH transmission is determined, the UE needs to further determine an initial CS index in the set of initial CS indexes as $(r_{PUCCH})$ mod $N_{CS}$.

PUCCH formats 0/1/4 do not support contiguous multi-PRB transmission in a frequency domain, but transmission in the unlicensed band of 60 GHz is usually limited by a maximum power spectral density (PSD) and a maximum equivalent isotropically radiated power (EIRP). In this case, an existing power enhancement scheme cannot achieve a maximum transmission power allowed, resulting in limited coverage of transmission of PUCCH formats 0/1/4.

Based on the technical problems described above, it is considered to increase the number of PRBs configured for PUCCH formats 0/1/4 under PSD limitation, so as to enhance coverage. Therefore, a resource determination scheme needs to be designed for a case where PUCCH formats 0/1/4 occupy multiple contiguous PRBs.

Technical solutions of the disclosure will be hereinafter described in detail with reference to embodiments.

Figure 2:
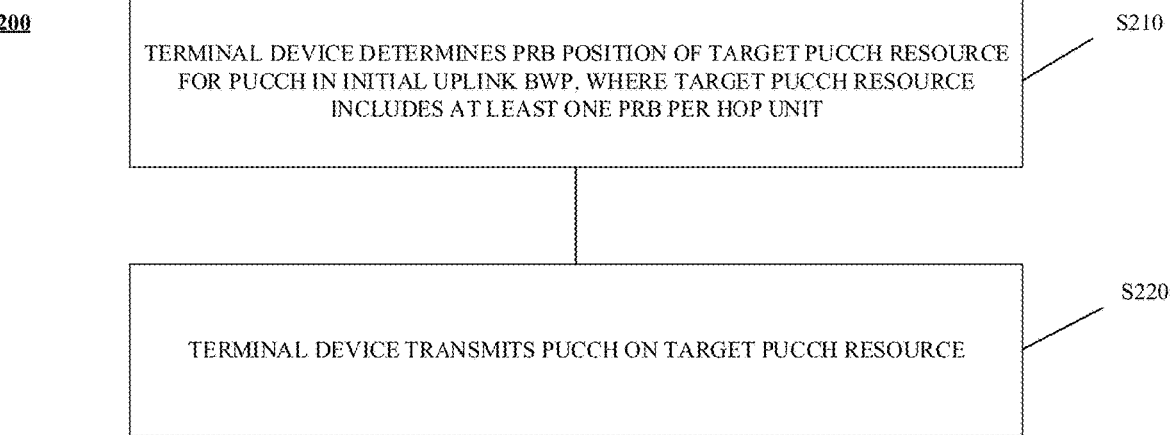
FIG. 2 is a schematic flow chart of a method for wireless communication according to embodiments of the disclosure.

FIG. 2 is a schematic flow chart of a method 200 for wireless communication according to embodiments of the disclosure. As illustrated in FIG. 2, the method 200 may include at least some of the following.

S210, a terminal device determines a PRB position of a target PUCCH resource for a PUCCH in an initial uplink BWP, where the target PUCCH resource includes at least one PRB per hop unit.

S220, the terminal device transmits the PUCCH on the target PUCCH resource.

In embodiments of the disclosure, the terminal device determines the PRB position of the target PUCCH resource for the PUCCH in the initial uplink BWP, where the target PUCCH resource includes the at least one PRB per hop unit, i.e., the target PUCCH resource includes multiple PRBs in multiple hop units. Therefore, transmission of the PUCCH on multiple PRBs can be supported, which can enhance coverage of the transmission of the PUCCH.

In some embodiments, the at least one PRB per hop unit may include at least one contiguous PRB.

In some embodiments, the target PUCCH resource is a common PUCCH resource configured for a terminal device in an unconnected state.

In some embodiments, a format of the PUCCH includes, but is not limited to, one of: PUCCH format 0, PUCCH format 1, and PUCCH format 4.

In some embodiments, the terminal device determines an index of the target PUCCH resource from a target PUCCH resource set according to the following formula 3:

$$r_{PUCCH} = \left\lfloor \frac{2 \cdot n_{CCE,0}}{N_{CCE}} \right\rfloor + 2 \cdot \Delta_{PRI} \qquad \text{formula 3}$$

$r_{PUCCH}$ is the index of the target PUCCH resource, $N_{CCE}$ is the number of CCEs in a CORESET for reception of downlink scheduling signaling by the terminal device, $n_{CCE,0}$ is an index of a first CCE for reception of the downlink scheduling signaling by the terminal device, and $\Delta_{PRI}$ is a value of a PUCCH resource indicator field in the downlink scheduling signaling.

In embodiments of the disclosure, prior to RRC connection establishment, a network device cannot obtain information of the terminal device. In order to ensure coverage of a PUCCH transmission, it needs to perform PUCCH transmission using PRBs the number of which is default or $\max(N_{RB})$ according to a preset rule.

Specifically, for example, the number of PRBs in the target PUCCH resource is determined according to the preset rule. For example, the preset rule is specified in a protocol, or, the preset rule is determined based on a PSD limit (upper limit) and an EIRP limit (upper limit). For example, the PSD limit Pmax_PSD=23 dBm/MHz, the EIRP limit Pmax_EIRP=40 dBm, and a bandwidth BW satisfying upper limit requirements is 50 MHz (BW= $10^{(max(EIRP)-PSD)/10)}=10^{((40-23)/10)}=50$ MHz. When a subcarrier spacing (SCS) is equal to 120 kHz, a bandwidth of PRBs is 1.44 MHz (120*12=1.44 MHz), and in this case, the configured maximum number of PRBs, $\max(N_{RB})$, is 34 ($\max(N_{RB})=\lfloor 50/1.44 \rfloor=34$). Similarly, when the SCS is equal to 480 kHz, $\max(N_{RB})=8$. When the SCS is equal to 960 kHz, $\max(N_{RB})=4$.

In some embodiments, the number of PRBs in the target PUCCH resource is equal to $\max(N_{RB})$.

In some embodiments, the operation at S210 may specifically include the following. The terminal device determines a first PRB index of the target PUCCH resource in a first hop unit and a second PRB index of the target PUCCH resource in a second hop unit according to at least one of: the number of PRBs in the target PUCCH resource, a PRB offset for the initial uplink BWP, the number of PRBs in the initial uplink BWP, the index of the target PUCCH resource, or the number of initial CS indexes in a set of initial CS indexes. The terminal device determines the PRB position of the target PUCCH resource in the initial uplink BWP according to the first PRB index, the second PRB index, and the number of PRBs in the target PUCCH resource.

In some embodiments, the first PRB index is a starting PRB index in all PRB indexes of the target PUCCH resource in the first hop unit. Alternatively, the first PRB index is a last PRB index in all the PRB indexes of the target PUCCH resource in the first hop unit. Alternatively, the first PRB index is an intermediate PRB index in all the PRB indexes of the target PUCCH resource in the first hop unit.

Specifically, for example, in a case where the first PRB index is an intermediate PRB index in all the PRB indexes of the target PUCCH resource in the first hop unit, the first PRB index may be any PRB index except the starting PRB index and the last PRB index in all the PRB indexes of the target PUCCH resource in the first hop unit, or the first PRB index may be a middlemost PRB index in all the PRB indexes of the target PUCCH resource in the first hop unit.

In some embodiments, the second PRB index is a starting PRB index in all PRB indexes of the target PUCCH resource in the second hop unit. Alternatively, the second PRB index is a last PRB index in all the PRB indexes of the target PUCCH resource in the second hop unit. Alternatively, the second PRB index is an intermediate PRB index in all the PRB indexes of the target PUCCH resource in the second hop unit.

Specifically, for example, in a case where the second PRB index is the intermediate PRB index in all the PRB indexes of the target PUCCH resource in the second hop unit, the second PRB index may be any PRB index except the starting PRB index and the last PRB index in all the PRB indexes of the target PUCCH resource in the second hop unit, or the second PRB index may be a middlemost PRB index in all the PRB indexes of the target PUCCH resource in the second hop unit.

In some embodiments, the terminal device can determine the first PRB index of the target PUCCH resource in the first hop unit and the second PRB index of the target PUCCH resource in the second hop unit according to the number of PRBs in the target PUCCH resource, the number of PRBs in the initial uplink BWP, the index of the target PUCCH resource, and the number of initial CS indexes in the set of initial CS indexes.

In some embodiments, when $\lfloor r_{PUUCH}/8 \rfloor=0$, the first PRB index is the starting index in all the PRB indexes of the target PUCCH resource in the first hop unit. When $\lfloor r_{PUUCH}/8 \rfloor=1$, the first PRB index is the last PRB index in all the PRB indexes of the target PUCCH resource in the first hop unit. In addition, when $\lfloor r_{PUUCH}/8 \rfloor=0$, the second PRB index is the last PRB index in all the PRB indexes of the target PUCCH resource in the second hop unit. When $\lfloor r_{PUUCH}/8 \rfloor=1$, the second PRB index is the starting PRB index in all the PRB indexes of the target PUCCH resource in the second hop unit. Specifically, the first PRB index and the second PRB index can be determined in the following manner.

When $\lfloor r_{PUUCH}/8 \rfloor=0$, the terminal device determines the first PRB index as $N_{RB}*(\lfloor r_{PUUCH}/(N_{CS}) \rfloor)$, and determines the second PRB index as $$N_{BWP}^{size} - 1 - N_{RB}^*(\lfloor r_{PUUCH}/(N_{CS}) \rfloor).$$

And/or, when $\lfloor r_{PUUCH}/8 \rfloor=1$, the terminal device determines the first PRB index as $$N_{BWP}^{size} - 1 - N_{RB}^*(\lfloor (r_{PUUCH} - 8)/(N_{CS}) \rfloor),$$

and determines the second PRB index as $N_{RB}*(\lfloor r_{PUUCH}-8/(N_{CS}) \rfloor)$. $N_{RB}$ is the number of PRBs in the target PUCCH resource, $r_{PUUCH}$ is the index of the target PUCCH resource, $$N_{BWP}^{size}$$

is the number of PRBs in the initial uplink BWP, $N_{CS}$ is the number of initial CS indexes in the set of initial CS indexes, and $\lfloor \; \rfloor$ represents a floor function.

In some embodiments, the terminal device determines the first PRB index of the target PUCCH resource in the first hop unit and the second PRB index of the target PUCCH resource in the second hop unit according to the number of PRBs in the target PUCCH resource, the PRB offset for the initial uplink BWP, the number of PRBs in the initial uplink BWP, the index of the target PUCCH resource, and the number of initial CS indexes in the set of initial CS indexes.

In some embodiments, when $\lfloor r_{PUUCH}/8 \rfloor=0$, the first PRB index is the starting PRB index in all the PRB indexes of the target PUCCH resource in the first hop unit. When $\lfloor r_{PUUCH}/8 \rfloor=1$, the first PRB index is the last PRB index in all the PRB indexes of the target PUCCH resource in the first hop unit. In addition, when $\lfloor r_{PUUCH}/8 \rfloor=0$, the second PRB index is the last PRB index in all the PRB indexes of the target PUCCH resource in the second hop unit. When $\lfloor r_{PUUCH}/8 \rfloor=1$, the second PRB index is the starting PRB index in all the PRB indexes of the target PUCCH resource in the second hop unit. Specifically, the first PRB index and the second PRB index can be determined in the following manner. When $\lfloor r_{PUUCH}/8 \rfloor=0$, the terminal device determines the first PRB index as $$N_{RB}^*(RB_{BWP}^{offset} + \lfloor r_{PUUCH}/(N_{CS}) \rfloor),$$

and determines the second PRB index as $$N_{BWP}^{size} - 1 - N_{RB}^*(RB_{BWP}^{offset} + \lfloor r_{PUUCH}/(N_{CS}) \rfloor).$$

And/or, when $\lfloor r_{PUUCH}/8 \rfloor=1$, the terminal device determines the first PRB index as $$N_{BWP}^{size} - 1 - N_{RB}^*(RB_{BWP}^{offset} + \lfloor (r_{PUUCH} - 8)/(N_{CS}) \rfloor),$$

and determines the second PRB index as $$N_{RB}^*(RB_{BWP}^{offset} + \lfloor (r_{PUCCH} - 8)/(N_{CS}) \rfloor).$$

$N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \; \rfloor$ represents a floor function.

In some embodiments, when $\lfloor r_{PUUCH}/8 \rfloor=0$, the first PRB index is the starting PRB index in all the PRB indexes of the target PUCCH resource in the first hop unit. When $\lfloor r_{PUUCH}/8 \rfloor=1$, the first PRB index is the last PRB index in all the PRB indexes of the target PUCCH resource in the first hop unit. In addition, when $\lfloor r_{PUUCH}/8 \rfloor=0$, the second PRB index is the last PRB index in all the PRB indexes of the target PUCCH resource in the second hop unit. When $\lfloor r_{PUUCH}/8 \rfloor=1$, the second PRB index is the starting PRB index in all the PRB indexes of the target PUCCH resource in the second hop unit. Specifically, the PRB position of the target PUCCH resource in the initial uplink BWP can be determined in the following manner. When $\lfloor r_{PUUCH}/8 \rfloor=0$, the terminal device determines that PRB indexes of the target PUCCH resource in the first hop unit in the initial uplink BWP are from $$N_{PRB}^{start}(0, 1) \text{ to } N_{PRB}^{start}(0, 1) + N_{RB} - 1,$$

and determines that PRB indexes of the target PUCCH resource in the second hop unit in the initial uplink BWP are from $$N_{PRB}^{start}(0, 2) - N_{RB} + 1 \text{ to } N_{PRB}^{start}(0, 2).$$

And/or, when $\lfloor r_{PUUCH}/8 \rfloor=1$, the terminal device determines that the PRB indexes of the target PUCCH resource in the first hop unit in the initial uplink BWP are from $$N_{PRB}^{start}(1, 1) - N_{RB} + 1 \text{ to } N_{PRB}^{start}(1, 1),$$

and determines that the PRB indexes of the target PUCCH resource in the second hop unit in the initial uplink BWP are from $$N_{PRB}^{start}(1, 2) \text{ to } N_{PRB}^{start}(1, 2) + N_{RB} - 1.$$

$N_{RB}$ is the number of PRBs in the target PUCCH resource, $r_{PUUCH}$ is the index of the target PUCCH resource, $$N_{PRB}^{start}(0, 1)$$

is the first PRB index when $$\lfloor r_{PUUCH}/8 \rfloor = 0, \, N_{PRB}^{start}(0, 2)$$

is the second PRB index when $$\lfloor r_{PUUCH}/8 \rfloor = 0, \, N_{PRB}^{start}(1, 1)$$

is the first PRB index when $$\lfloor r_{PUUCH}/8 \rfloor = 1, \, N_{PRB}^{start}(1, 2)$$

is the second PRB index when $\lfloor r_{PUUCH}/8 \rfloor = 1$, and $\lfloor \ \rfloor$ represents a floor function.

Figure 3:
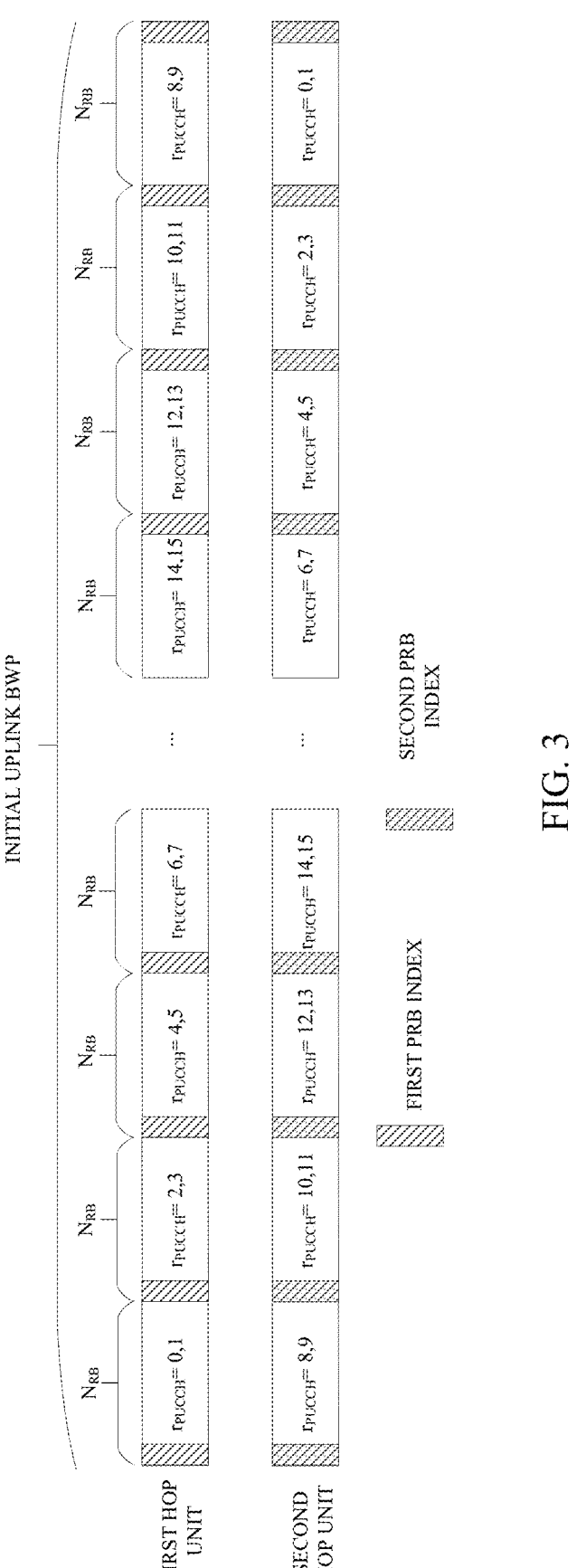
FIG. 3 to FIG. 14 are schematic diagrams each illustrating resources in hop units according to embodiments of the disclosure.

For example, as illustrated in FIG. 3, when $N_{CS}$ is 2, in the first hop unit, two PUCCHs with $r_{PUCCH}=0$, 1 occupy $N_{RB}$ PRBs through code-division multiplexing, two PUCCHs with $r_{PUCCH}=2$, 3 occupy $N_{RB}$ PRBs through code-division multiplexing, two PUCCHs with $r_{PUCCH}=4$, 5 occupy $N_{RB}$ PRBs through code-division multiplexing, two PUCCHs with $r_{PUCCH}=6$, 7 occupy $N_{RB}$ PRBs through code-division multiplexing, two PUCCHs with $r_{PUCCH}=14$, 15 occupy $N_{RB}$ PRBs through code-division multiplexing, two PUCCHs with $r_{PUCCH}=12$, 13 occupy $N_{RB}$ PRBs through code-division multiplexing, two PUCCHs with $r_{PUCCH}=10$, 11 occupy $N_{RB}$ PRBs through code-division multiplexing, two PUCCHs with $r_{PUCCH}=8$, 9 occupy $N_{RB}$ PRBs through code-division multiplexing. When $N_{CS}$ is 2, in the second hop unit, two PUCCHs with $r_{PUCCH}=0$, 1 occupy $N_{RB}$ PRBs through code-division multiplexing, two PUCCHs with $r_{PUCCH}=2$, 3 occupy $N_{RB}$ PRBs through code-division multiplexing, two PUCCHs with $r_{PUCCH}=4$, 5 occupy $N_{RB}$ PRBs through code-division multiplexing, two PUCCHs with $r_{PUCCH}=6$, 7 occupy $N_{RB}$ PRBs through code-division multiplexing, two PUCCHs with $r_{PUCCH}=14$, 15 occupy $N_{RB}$ PRBs through code-division multiplexing, two PUCCHs with $r_{PUCCH}=12$, 13 occupy $N_{RB}$ PRBs through code-division multiplexing, two PUCCHs with $r_{PUCCH}=10$, 11 occupy $N_{RB}$ PRBs through code-division multiplexing, two PUCCHs with $r_{PUCCH}=8$, 9 occupy $N_{RB}$ PRBs through code-division multiplexing.

In addition, as illustrated in FIG. 3, for PUCCH resources with various indexes $r_{PUCCH}$, specific PRBs in the target PUCCH resource in different hop units can be determined in different manners. In the first hop unit, the first PRB index is a starting PRB index in all the PRB indexes when $r_{PUCCH}$ ranges from 0 to 7, and the first PRB index is a last PRB index in all the PRB indexes when $r_{PUCCH}$ ranges from 8 to 15. In the second hop unit, the second PRB index is a last PRB index in all the PRB indexes when $r_{PUCCH}$ ranges from 0 to 7, and the second PRB index is a starting PRB index in all the PRB indexes when $r_{PUCCH}$ ranges from 8 to 15. Such a design is conducive to ensuring that an interval between a PRB in the target PUCCH resource in the first hop unit and a PRB in the target PUCCH resource in the second hop unit is relatively large, so that a maximum frequency diversity gain can be obtained through frequency hopping.

In some embodiments, the first PRB index is the starting PRB index in all the PRB indexes of the target PUCCH resource in the first hop unit, and the second PRB index is the starting PRB index in all the PRB indexes of the target PUCCH resource in the second hop unit. Specifically, the first PRB index and the second PRB index can be determined in the following manner. When $\lfloor r_{PUUCH}/8 \rfloor = 0$, the terminal device determines the first PRB index as $N_{RB}$ ($\lfloor r_{PUUCH}/(N_{CS}) \rfloor$), and determines the second PRB index as $$N_{BWP}^{size} - N_{RB} * (\lfloor r_{PUUCH}/(N_{CS}) \rfloor + 1).$$

And/or, when $\lfloor r_{PUUCH}/8 \rfloor = 1$, the terminal device determines the first PRB index as $$N_{BWP}^{size} - N_{RB} * (\lfloor (r_{PUUCH} - 8)/(N_{CS}) \rfloor + 1),$$

and determines the second PRB index as $N_{RB}*(\lfloor r_{PUUCH}-8)/(N_{CS}) \rfloor)$. $N_{RB}$ is the number of PRBs in the target PUCCH resource, $r_{PUUCH}$ is the index of the target PUCCH resource, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, the first PRB index is the starting PRB index in all the PRB indexes of the target PUCCH resource in the first hop unit, and the second PRB index is the starting PRB index in all the PRB indexes of the target PUCCH resource in the second hop unit. Specifically, the first PRB index and the second PRB index can be determined in the following manner. When $\lfloor r_{PUUCH}8/ \rfloor = 0$, the terminal device determines the first PRB index as $$N_{RB} * (RB_{BWP}^{offset} + \lfloor r_{PUUCH}/(N_{CS}) \rfloor),$$

and determines the second PRB index as $$N_{BWP}^{size} - N_{RB} * (RB_{BWP}^{offset} + \lfloor r_{PUUCH}/(N_{CS}) \rfloor + 1).$$

And/or, when $\lfloor r_{PUUCH}/8 \rfloor = 1$, the terminal device determines the first PRB index as $$N_{BWP}^{size} - N_{RB} * (RB_{BWP}^{offset} + \lfloor (r_{PUUCH} - 8)/(N_{CS}) \rfloor + 1),$$

and determines the second PRB index as $$N_{RB} * (RB_{BWP}^{offset} + \lfloor (r_{PUUCH} - 8)/(N_{CS}) \rfloor).$$

$N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \; \rfloor$ represents a floor function.

In some embodiments, the first PRB index is the starting PRB index in all the PRB indexes of the target PUCCH resource in the first hop unit, and the second PRB index is the starting PRB index in all the PRB indexes of the target PUCCH resource in the second hop unit. Specifically, the PRB position of the target PUCCH resource in the initial uplink BWP can be determined in the following manner. When $\lfloor r_{PUUCH}/8 \rfloor=0$, the terminal device determines that PRB indexes of the target PUCCH resource in the first hop unit in the initial uplink BWP range from $$N_{PRB}^{start}(0, 1) \text{ to } N_{PRB}^{start}(0, 1) + N_{RB} - 1,$$

and determines that PRB indexes of the target PUCCH resource in the second hop unit in the initial uplink BWP range from $$N_{PRB}^{start}(0, 2) \text{ to } N_{PRB}^{start}(0, 2) + N_{RB} - 1.$$

And/or, when $\lfloor r_{PUUCH}/8 \rfloor=0$, the terminal device determines that the PRB indexes of the target PUCCH resource in the first hop unit in the initial uplink BWP range from $$N_{PRB}^{start}(1, 1)$$

to $$N_{PRB}^{start}(1, 1) + N_{RB} - 1,$$

and determines that the PRB indexes of the target PUCCH resource in the second hop unit in the initial uplink BWP range from $$N_{PRB}^{start}(1, 2) \text{ to } N_{PRB}^{start}(1, 2) + N_{RB} - 1.$$

$N_{RB}$ is the number of PRBs in the target PUCCH resource, $r_{PUUCH}$ is the index of the target PUCCH resource, $$N_{PRB}^{start}(0, 1)$$

is the first PRB index when $$\lfloor r_{PUUCH}/8 \rfloor = 0, N_{PRB}^{start}(0, 2)$$

is the second PRB index when $$\lfloor r_{PUUCH}/8 \rfloor = 0, N_{PRB}^{start}(1, 1)$$

is the first PRB index when $$\lfloor r_{PUUCH}/8 \rfloor = 1, N_{PRB}^{start}(1, 2)$$

is the second PRB index when $\lfloor r_{PUUCH}/8 \rfloor=1$, and $\lfloor \; \rfloor$ represents a floor function.

Figure 4:
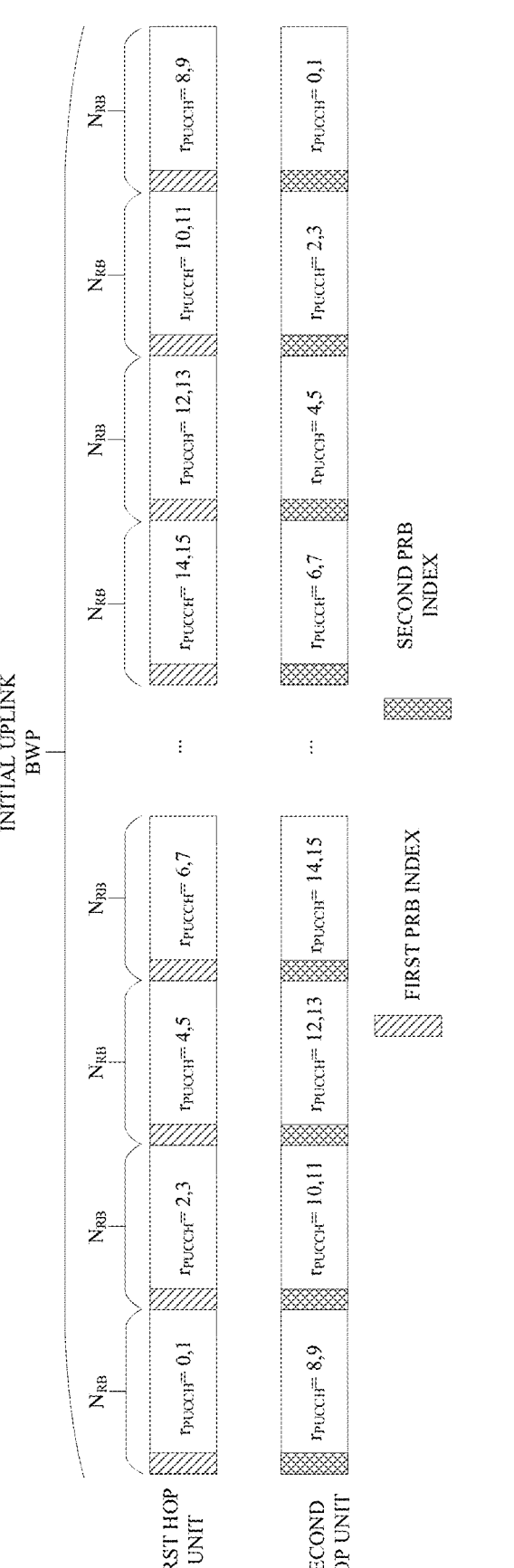

For example, as illustrated in FIG. 4, when $N_{CS}$ is 2, in the first hop unit, two PUCCHs with $r_{PUCCH}=0$, 1 occupy $N_{RB}$ PRBs through code-division multiplexing, two PUCCHs with $r_{PUCCH}=2$, 3 occupy $N_{RB}$ PRBs through code-division multiplexing, two PUCCHs with $r_{PUCCH}=4$, 5 occupy $N_{RB}$ PRBs through code-division multiplexing, two PUCCHs with $r_{PUCCH}=6$, 7 occupy $N_{RB}$ PRBs through code-division multiplexing, two PUCCHs with $r_{PUCCH}=14$, 15 occupy $N_{RB}$ PRBs through code-division multiplexing, two PUCCHs with $r_{PUCCH}=12$, 13 occupy $N_{RB}$ PRBs through code-division multiplexing, two PUCCHs with $r_{PUCCH}=10$, 11 occupy $N_{RB}$ PRBs through code-division multiplexing, two PUCCHs with $r_{PUCCH}=8$, 9 occupy $N_{RB}$ PRBs through code-division multiplexing. When $N_{CS}$ is 2, in the second hop unit, two PUCCHs with $r_{PUCCH}=0$, 1 include $N_{RB}$ PRBs through code-division multiplexing, two PUCCHs with $r_{PUCCH}=2$, 3 occupy $N_{RB}$ PRBs through code-division multiplexing, two PUCCHs with $r_{PUCCH}=4$, 5 occupy $N_{RB}$ PRBs through code-division multiplexing, two PUCCHs with $r_{PUCCH}=6$, 7 occupy $N_{RB}$ PRBs through code-division multiplexing, two PUCCHs with $r_{PUCCH}=14$, 15 occupy $N_{RB}$ PRBs through code-division multiplexing, two PUCCHs with $r_{PUCCH}=12$, 13 occupy $N_{RB}$ PRBs through code-division multiplexing, two PUCCHs with $r_{PUCCH}=10$, 11 occupy $N_{RB}$ PRBs through code-division multiplexing, two PUCCHs with $r_{PUCCH}=8$, 9 occupy $N_{RB}$ PRBs through code-division multiplexing.

In addition, as illustrated in FIG. 4, for PUCCH resources with various indexes $r_{PUCCH}$, specific PRBs in the target PUCCH resource in different hop units can be determined in the same manner. In the first hop unit, the first PRB index is a starting PRB index in all the PRB indexes when $r_{PUCCH}$ ranges from 0 to 15. In the second hop unit, the second PRB index is a starting PRB index in all the PRB indexes when $r_{PUCCH}$ ranges from 0 to 15. Such a design is conducive to ensuring that an interval between a PRB of the target PUCCH resource in the first hop unit and a PRB of the target PUCCH resource in the second hop unit is relatively large, so that a maximum frequency diversity gain can be obtained through frequency hopping. Furthermore, it can be ensured that specific PRBs in the target PUCCH resource are determined in a unified manner.

In an initial access phase, it can be defined in a protocol that a PUCCH resource set contains K PUCCH resources, the number of PRBs for each PUCCH transmission is $N_{RB}$, code-division multiplexing capability provided through initial CS is $N_{CS}$, and in this case $(K/N_{CS})*N_{RB}$ PRBs are required to support the PUCCH resource set. However, since the number of PRBs in the initial uplink BWP, $$N_{BWP}^{size},$$

is limited, it is possible that a bandwidth of the initial uplink BWP cannot support the PUCCH resource set.

For example, when K=16, $N_{CS}$=2, and $N_{RB}$=34, 272 ((16/2)*34=272) PRBs are required to support all the PUCCH resources in the PUCCH resource set. For example, in the case where the bandwidth of the initial uplink BWP is 100 MHz, when the SCS is 120 kHz, theoretically, the bandwidth of the initial uplink BWP merely can support $$69 \left( N_{BWP}^{size} = \lfloor 100/1.44 \rfloor = 69 \right)$$

PRBs and cannot support 272 PRBs required.

In order to ensure coverage, the number of PUCCH resources in the PUCCH resource set needs to be adjusted, so that it can be ensured that the PUCCH resources can be supported by the bandwidth of the initial uplink BWP.

In some embodiments, the terminal device determines the target PUCCH resource from M PUCCH resources in the target PUCCH resource set, where M is a positive integer and M≤K, and K is the number of PUCCH resources in the target PUCCH resource set as defined in the protocol.

For example, K=16. That is, it is defined in the protocol that the target PUCCH resource set contains 16 PUCCH resources.

In some embodiments, the terminal device determines the M PUCCH resources in the target PUCCH resource set according to at least one of: the number of PRBs in the target PUCCH resource, the PRB offset for the initial uplink BWP, the number of PRBs in the initial uplink BWP, or the number of the initial CS indexes in the set of initial CS indexes.

In a high-frequency scenario, beamforming-based transmission results in a lower probability of user multiplexing in the same beam. Therefore, the number of PUCCH resources in each PUCCH resource set, $R_{PUCCH}$, can be decreased, i.e., multiplexing capability of the PUCCH resource set can be reduced, which can ensure that the PUCCH resources can be supported by the bandwidth of the initial uplink BWP.

In some embodiments, the terminal device determines that M is equal to $R_{PUCCH}$, where $$R_{PUCCH} = N_{CS}^* \lfloor (N_{BWP}^{size} - RB_{BWP}^{offset})/N_{RB} \rfloor.$$

In addition, the terminal device determines, according to $R_{PUCCH}$, the M PUCCH resources from the K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, the terminal device determines first M PUCCH resources in the K PUCCH resources in the target PUCCH resource set that are defined in the protocol as the M PUCCH resources. For example, K=16, PUCCH resources with index $r_{PUUCH}$ satisfying $0 \le r_{PUUCH} < R_{PUCCH}$ in the target PUCCH resource set are reserved, and PUCCH resources with index $r_{PUUCH}$ satisfying $R_{PUCCH} \le r_{PUUCH} \le 15$ in the target PUCCH resource set are abandoned.

Figures 5, 6:
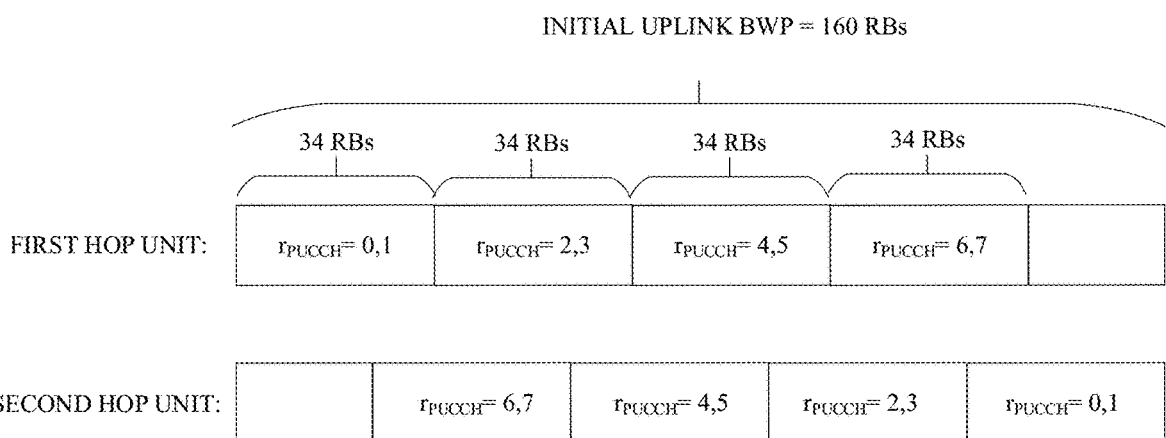

For example, $$N_{BWP}^{size} = 160, N_{CS} = 2, RB_{BWP}^{offset} = 0,$$

and $N_{RB}$=34. In this case, the number of PUCCH resources in the target PUCCH resource set, $R_{PUCCH}$, is adjusted to 8 ($R_{PUCCH}$=2*$\lfloor((160-0))/34\rfloor$=8). Therefore, as illustrated in FIG. 5, PUCCH resources with index $r_{PUUCH}$ satisfying $0 \le r_{PUUCH} < 8$ in the target PUCCH resource set are reserved, and PUCCH resources with index $r_{PUUCH}$ satisfying $8 \le r_{PUUCH} \le 15$ in the target PUCCH resource set are abandoned. Such a design is conducive to ensuring that an interval between a PRB in the target PUCCH resource in the first hop unit and a PRB in the target PUCCH resource in the second hop unit is relatively large, so that a maximum frequency diversity gain can be obtained through frequency hopping.

In some embodiments, the terminal device determines that M is equal to $R_{PUCCH}$, where $$R_{PUCCH} = N_{CS} * \lceil (N_{BWP}^{size} - RB_{BWP}^{offset})/N_{RB} \rceil.$$

In addition, the terminal device determines, according to $R_{PUCCH}$, the M PUCCH resources from the K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lceil \ \rceil$ represents a ceiling function.

In some embodiments, the terminal device determines first M PUCCH resources in the K PUCCH resources in the target PUCCH resource set that are defined in the protocol as the M PUCCH resources, i.e., $0 \le r_{PUUCH} \le M$.

Specifically, for example, $$N_{BWP}^{size} = 160, N_{CS} = 2, RB_{BWP}^{offset} = 0,$$

and $N_{RB}=34$. In this case, the number of PUCCH resources in the target PUCCH resource set is adjusted to 10 ($R_{PUCCH}=2*\lfloor((160-0)/34\rfloor=10$). In addition, as illustrated in FIG. 6, the number of PRBs in each of PUCCH resources with index $r_{PUUCH}$ satisfying $0 \le r_{PUUCH} < 8$ is still $N_{RB}$ which equals 34, and the number of PRBs in each of PUCCH resources with index $r_{PUUCH}$ satisfying $r_{PUUCH}=8$, 9 is 24 ((160)mod 34=24).

In some embodiments, when $$R_{PUCCH} = N_{CS} * \lceil (N_{BWP}^{size} - RB_{BWP}^{offset})/N_{RB} \rceil,$$

the number of PRBs in each of PUCCH resources with resource indexes from 0 to $R_{PUCCH}-N_{CS}-1$ in the M PUCCH resources is $N_{RB}$, and the number of PRBs in each of PUCCH resources with resource indexes from $R_{PUCCH}-N_{CS}$ to $R_{PUCCH}-1$ in the M PUCCH resources is $$(N_{BWP}^{size}) \bmod N_{RB},$$

where mod represents a modulo operation.

In some embodiments, the number of PRBs in each of the M PUCCH resources is $N_{RB}$ when $$R_{PUCCH} = N_{CS} * \lfloor (N_{BWP}^{size} - RB_{BWP}^{offset})/N_{RB} \rfloor.$$

In some embodiments, the terminal device determines that M is equal to $R_{PUCCH}$, where $$R_{PUCCH} = N_{CS} * \lfloor (N_{BWP}^{size} - RB_{BWP}^{offset})/N_{RB} \rfloor,$$

and $R_{PUCCH}$ is further adjusted to be a multiple of $2*N_{CS}$ by rounding down a calculation result. In addition, the terminal device determines the M PUCCH resources from the K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, when the terminal device determines that M is equal to $R_{PUCCH}$, and $R_{PUCCH}$ is further adjusted to be the multiple of $2*N_{CS}$ by rounding down the calculation result, the terminal device determines first M PUCCH resources in the K PUCCH resources in the target PUCCH resource set that are defined in the protocol as the M PUCCH resources, i.e., $0 \le r_{PUUCH} < M$.

In some embodiments, when the terminal device determines that M is equal to $R_{PUCCH}$, and $R_{PUCCH}$ is further adjusted to be the multiple of $2*N_{CS}$ by rounding down the calculation result, the number of PRBs in each of the M PUCCH resources is N.

In some embodiments, when the terminal device determines that M is equal to $R_{PUCCH}$ and $R_{PUCCH}$ is further adjusted to be the multiple of $2*N_{CS}$ by rounding down the calculation result, it can be defined that $R=R_{PUCCH}/2$.

Specifically, for example, when $\lfloor r_{PUUCH}/R \rfloor=0$, an index of a starting PRB in the target PUCCH resource in the first hop unit is $$N_{RB} * (RB_{BWP}^{offset} + \lfloor r_{PUUCH}/(N_{CS}) \rfloor),$$

and an index of a starting PRB in the target PUCCH resource in the second hop unit is $$N_{BWP}^{size} - 1 - N_{RB} * (RB_{BWP}^{offset} + \lfloor r_{PUUCH}/(N_{CS}) \rfloor).$$

And/or, when $\lfloor r_{PUCCH}/R \rfloor=1$, the index of the starting PRB in the target PUCCH resource in the first hop unit is $$N_{BWP}^{size} - 1 - N_{RB} * (RB_{BWP}^{offset} + \lfloor (r_{PUUCH} - R)/(N_{CS}) \rfloor),$$

and the terminal device determines that the index of the starting PRB in the target PUCCH resource in the second hop unit is $$N_{RB} * (RB_{BWP}^{offset} + \lfloor (r_{PUUCH} - R)/(N_{CS}) \rfloor).$$

Specifically, for example, $$N_{BWP}^{size} = 160, N_{CS} = 2, RB_{BWP}^{offset} = 0, \text{ and } N_{RB} = 34.$$

Figures 7, 8:
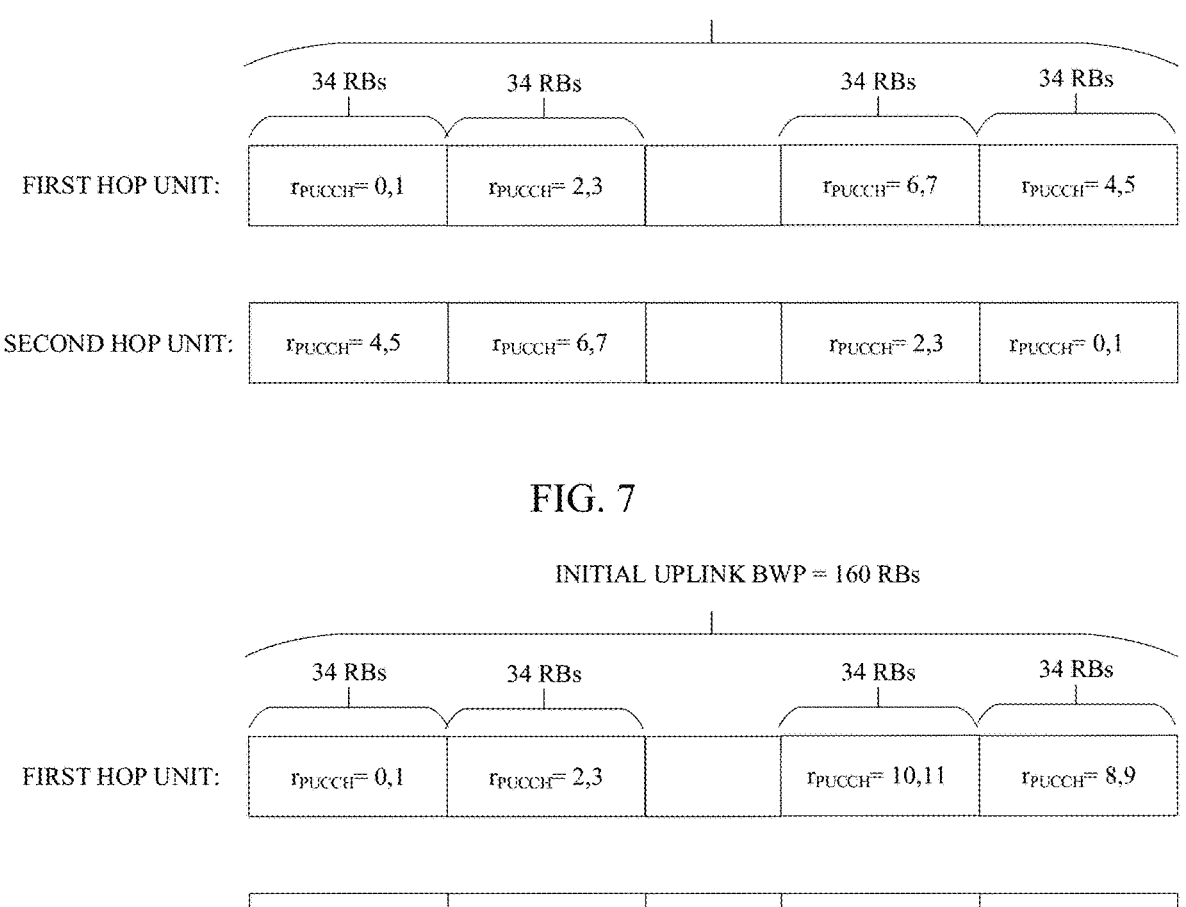

In this case, the number of PUCCH resources, $R_{PUCCH}$, in the target PUCCH resource set is adjusted to 8 ($R_{PUCCH}=2*\lfloor(160-0)/34\rfloor=8$, and since $R_{PUCCH}$ is a multiple of 4, there is no need to further adjust $R_{PUCCH}$, i.e., M=8. For example, as illustrated in FIG. 7, K=16, PUCCH resources with index $r_{PUUCH}$ satisfying $0 \le r_{PUUCH} < 8$ in the target PUCCH resource set are reserved, and PUCCH resources with index $r_{PUUCH}$ satisfying $8 \le r_{PUUCH} \le 15$ in the target PUCCH resource set are abandoned. In this case, $R=R_{PUCCH}/2=4$, and specifically, for example, mapping of $r_{PUUCH}$ to a PRB index is as follows. When $\lfloor r_{PUUCH}/R \rfloor=0$, an index of a starting PRB in the target PUCCH resource in the first hop unit is $34*(0+\lfloor r_{PUUCH}/2 \rfloor)$, and an index of a starting PRB in the target PUCCH resource in the second hop unit is $160-1-34*(0+\lfloor r_{PUUCH}/2 \rfloor)$. Specifically, for another example, when $\lfloor r_{PUUCH}/R \rfloor=1$, the index of the starting PRB in the target PUCCH resource in the first hop unit is $160-1-34*(0+\lfloor r_{PUUCH}-4)//2 \rfloor)$, and the index of the starting PRB in the target PUCCH resource in the second hop unit is $34*(0+r_{PUCCH}-4)/2 \rfloor)$.

In some embodiments, when the terminal device determines that M is equal to $R_{PUCCH}$, and $R_{PUCCH}$ is further adjusted to be the multiple of $2*N_{CS}$ by rounding down the calculation result, the terminal device determines that the M PUCCH resources include: first M/2 PUCCH resources in first K/2 PUCCH resources in the K PUCCH resources in the target PUCCH resource set that are defined in the protocol, and first M/2 PUCCH resources in last K/2 PUCCH resources in the K PUCCH resources in the target PUCCH resource set that are defined in the protocol, i.e., $0 \leq r_{PUUCH} < M/2$ and $K/2 \leq r_{PUUCH} < K/2M/2$.

Specifically, for example, $$N_{BWP}^{size} = 160, N_{CS} = 2, RB_{BWP}^{offset} = 0,$$

and $N_{RB}=34$. In this case, the number of PUCCH resources in the target PUCCH resource set, $R_{PUCCH}$, is adjusted to be 8 ($R_{PUCCH}=2*\lfloor(160-0)/34\rfloor=8$), and since $R_{PUCCH}$ is a multiple of 4, there is no need to further adjust $R_{PUCCH}$, i.e., M=8. For example, as illustrated in FIG. 8, K=16, PUCCH resources with index $r_{PUUCH}$ satisfying $0 \leq r_{PUUCH} < 4$ and $8 \leq r_{PUUCH} < 12$ in the target PUCCH resource set are reserved, PUCCH resources with index $r_{PUUCH}$ satisfying $4 \leq r_{PUUCH} < 8$ and $12 \leq r_{PUUCH} < 16$ in the target PUCCH resource set are abandoned, and the number of PRBs in each of the M PUCCH resources is $N_{RB}$, i.e., 34.

In some embodiments, the terminal device determines that M is $R_{PUCCH}+2*N_{CS}$, where $$R_{PUCCH} = N_{CS} * \lfloor (N_{BWP}^{size} - RB_{BWP}^{offset})/N_{RB} \rfloor,$$

and $R_{PUCCH}$ is further adjusted to be a multiple of $2*N_{CS}$ by rounding down a calculation result. In addition, the terminal device determines the M PUCCH resources from the K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, when the terminal device determines that M is $R_{PUCCH}+2*N_{CS}$, and $R_{PUCCH}$ is further adjusted to be the multiple of $2*N_{CS}$ by rounding down calculation result, the terminal device determines first M PUCCH resources in the K PUCCH resources in the target PUCCH resource set that are defined in the protocol as the M PUCCH resources, i.e., $0 \leq r_{PUUCH} < M$.

In some embodiments, when the terminal device determines that M is $R_{PUCCH}+2*N_{CS}$, and $R_{PUCCH}$ is further adjusted to be the multiple of $2*N_{CS}$ by rounding down calculation result, the number of PRBs in each of PUCCH resources with resource indexes from 0 to $R-N_{CS}-1$ in the M PUCCH resources is $N_{RB}$, the number of PRBs in each of PUCCH resources with resource indexes from R to $R_{PUCCH}+N_{CS}-1$ in the M PUCCH resources is $N_{RB}$, the number of PRBs in each of PUCCH resources with resource indexes from $R-N_{CS}$ to $R-1$ in the M PUCCH resources is $$((N_{BWP}^{size})\mathrm{mod}N_{RB})/2,$$

and the number of PRBs in each of PUCCH resources with resource indexes from $R_{PUCCH}+N_{CS}$ to $R_{PUCCH}+2N_{CS}-1$ in the M PUCCH resources is $$((N_{BWP}^{size})\mathrm{mod}N_{RB})/2,$$

where $R=(R_{PIUCCH}+2*N_{CS})/2$ or R=M/2, and mod represents a modulo operation.

Specifically, for example, $$N_{BWP}^{size} = 160, N_{CS} = 2, RB_{BWP}^{offset} = 0, \text{ and } N_{RB} = 34.$$

Figures 9, 10:
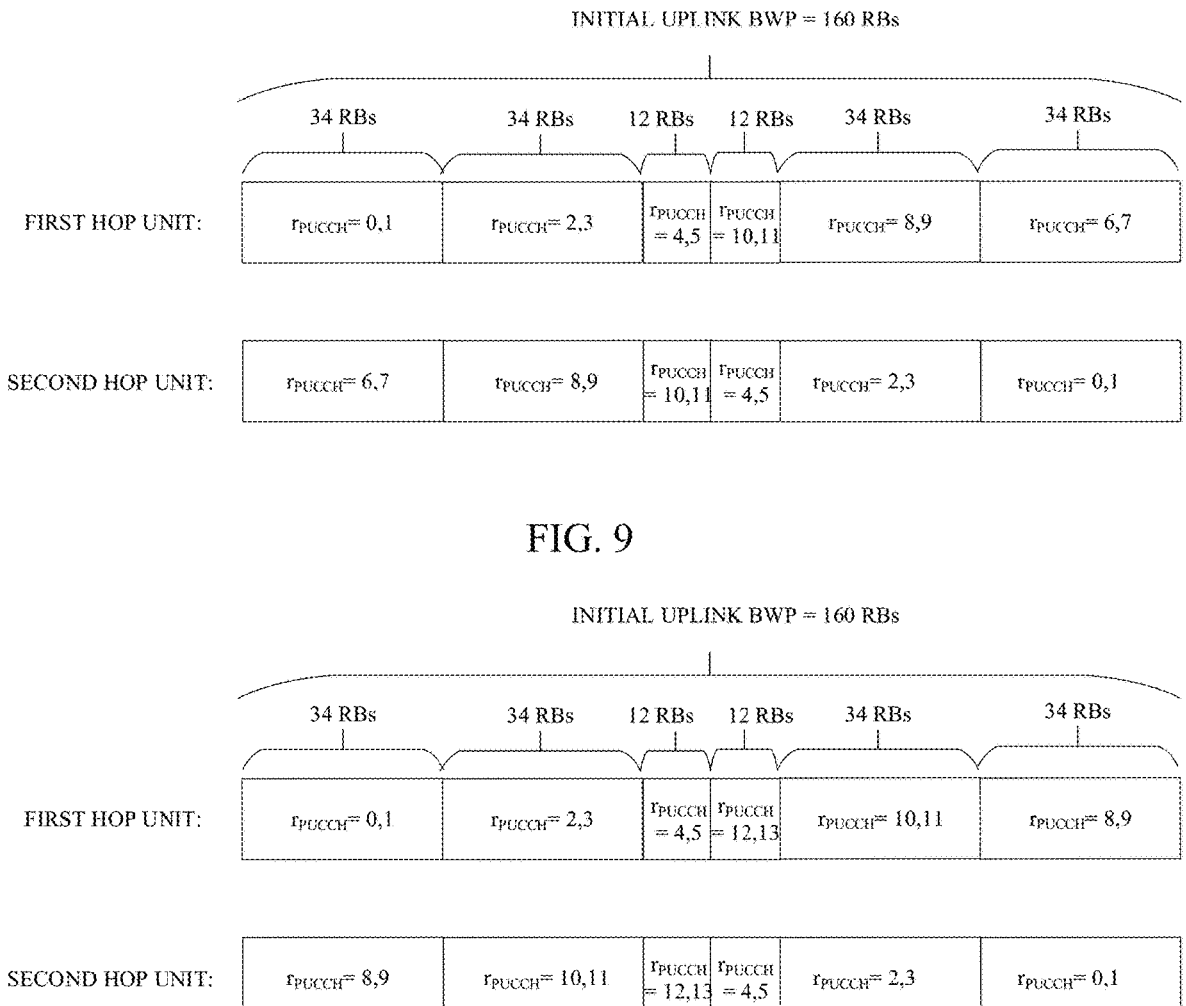

In this case, the number of PUCCH resources in the target PUCCH resource set, $R_{PUCCH}$, is adjusted to 8 ($R_{PUCCH}=2*\lfloor((160-0))/34\rfloor=8$), and in order to further utilize the remaining PRBs in a BWP, $M=R_{PUCCH}+2*N_{CS}=8+4=12$. In this case, R=M/2=6. As illustrated in FIG. 9, the number of PRBs in each of PUCCH resources with index $r_{PUUCH}$ satisfying $0 \leq r_{PUUCH} < 4$ and $6 \leq r_{PUUCH} < 10$ is still $N_{RB}$ which equals 34, and the number of PRBs in each of PUCCH resources with index $r_{PUUCH}$ satisfying $4 \leq r_{PUUCH} < 6$ and $10 \leq r_{PUUCH} < 12$ is 12 (((160)mod 34)/2=12).

In some embodiments, when the terminal device determines that M is $R_{PUCCH}+2*N_{CS}$, and $R_{PUCCH}$ is further adjusted to be the multiple of $2*N_{CS}$ by rounding down the calculation result, the terminal device determines that the M PUCCH resources include: first M/2 PUCCH resources in first K/2 PUCCH resources in the K PUCCH resources in the target PUCCH resource set that are defined in the protocol, and first M/2 PUCCH resources in last K/2 PUCCH resources in the K PUCCH resources in the target PUCCH resource set that are defined in the protocol, i.e., $0 \leq r_{PUUCH} < M/2$ and $K/2 \leq r_{PUUCH} < K/2+M/2$.

In some embodiments, when the terminal device determines that M is $R_{PUCCH}+2*N_{CS}$, and $R_{PUCCH}$ is further adjusted to be the multiple of $2*N_{CS}$ by rounding down calculation result, the number of PRBs in each of PUCCH resources with resource indexes from 0 to $R_{PUCCH}/2-1$ in the M PUCCH resources is $N_{RB}$, the number of PRBs in each of PUCCH resources with resource indexes from K/2 to $K/2+R_{PUCCH}/2-1$ in the M PUCCH resources is $N_{RB}$, the number of PRBs in each of PUCCH resources with resource indexes from $R_{PUCCH}/2$ to $R_{PUCCH}/2+N_{CS}-1$ in the M PUCCH resources is $$((N_{BWP}^{size})\mathrm{mod}N_{RB})/2,$$

and the number of PRBs in each of PUCCH resources with resource indexes from $K/2+R_{PUCCH}/2$ to $K/2+R_{PUCCH}/2+N_{CS}-1$ in the M PUCCH resources is $$((N_{BWP}^{size}) \bmod N_{RB})/2,$$

where mod represents a modulo operation.

Specifically, for example, $$N_{BWP}^{size} = 160, N_{CS} = 2, PB_{BWP}^{offset} = 0, \text{ and } N_{RB} = 34.$$

In this case, the number of PUCCH resources in the target PUCCH resource set is adjusted to 8 ($R_{PUCCH}=2*\lfloor(160-0)/34\rfloor=8$), and in order to further utilize the remaining PRBs in a BWP, $M=R_{PUCCH}+2*N_{CS}=8+4=12$. As illustrated in FIG. 10, the number of PRBs in each of PUCCH resources with indexes $r_{PUUCH}$ satisfying $0 \le r_{PUUCH} < 4$ and $8 \le r_{PUUCH} < 12$ is still $N_{RB}$ which equals 34, and the number of PRBs in each of PUCCH resources with indexes $r_{PUUCH}$ satisfying $4 \le r_{PUUCH} < 6$ and $12 \le r_{PUUCH} < 14$ is $12(((160) \bmod 34)/2=12)$.

In some embodiments, a value of M is pre-configured or specified in the protocol. Specifically, for example, different initial uplink BWPs correspond to different values of M, respectively. That is, the value of M is set to ensure that the PUCCH resources in the target PUCCH resource set can be supported by a bandwidth of the initial uplink BWP. For example, as illustrated in Table 3, when the bandwidth of the initial uplink BWP is 100 MHz, $M/N_{CS}=2$ in the case of a SCS of 120 kHz, when the bandwidth of the initial uplink BWP is 200 MHz, $M/N_{CS}=4$ in the case of a SCS of 120 kHz, and when the bandwidth of the initial uplink BWP is 400 MHz, $M/N_{CS}=8$ in the case of a SCS of 120 kHz, where $N_{CS}$ is the number of initial CS indexes in the set of initial CS indexes. In this way, it can be realized that code-division multiplexing in transmission of $N_{CS}$ PUCCHs can be performed on the same PRB.

TABLE 3

| Bandwidth of initial uplink BWP (MHz) | M/N$_{CS}$ in the case of SCS of 120 kHz |
| --- | --- |
| 100 | 2 |
| 200 | 4 |
| 400 | 8 |

It is to be noted that, in Table 3 above, the SCS of 120 kHz is merely taken as an example for illustration, and other SCSs are also applicable.

In some embodiments, the value of M is configured by the network device via system information (e.g., SIB1). Specifically, for example, different PUCCH-resource-number indexes correspond to different values of M, respectively, where the PUCCH-resource-number index indicates the number of PUCCH resources in the target PUCCH resource set. For example, as illustrated in Table 4, PUCCH-resource-number index 0 corresponds to 1 ($M/N_{CS}=1$, PUCCH-resource-number index 1 corresponds to 2 ($M/N_{CS}=2$), PUCCH-resource-number index 2 corresponds to 4 ($M/N_{CS}=4$), and PUCCH-resource-number index 3 corresponds to 8 ($M/N_{CS}=8$), where $N_{CS}$ is the number of initial CS indexes in the set of initial CS indexes. In this way, it can be realized that code-division multiplexing in transmission of $N_{CS}$ PUCCHs can be performed on the same PRB. In some embodiments, taking $N_{CS}=2$ as an example, PUCCH-resource-number index 0 may indicate that the target PUCCH resource set contains two PUCCH resources as an example, PUCCH-resource-number index 1 may indicate that the target PUCCH resource set contains four PUCCH resources as an example, PUCCH-resource-number index 2 may indicate that the target PUCCH resource set contains eight PUCCH resources as an example, and PUCCH-resource-number index 3 may indicate that the target PUCCH resource set contains 16 PUCCH resources as an example.

TABLE 4

| PUCCH-resource-number index | M/N$_{CS}$ |
| --- | --- |
| 0 | 1 |
| 1 | 2 |
| 2 | 4 |
| 3 | 8 |

In some embodiments, the value of M is indicated by the network device via at least one bit in the PUCCH resource indicator field in downlink scheduling signaling. For example, the network device indicates that M=4 via one bit in the PUCCH resource indicator field in the downlink scheduling signaling. The network device indicates that M=8 via 2 bits in the PUCCH resource indicator field in the downlink scheduling signaling. The network device indicates that M=16 via 3 bits in the PUCCH resource indicator field in the downlink scheduling signaling. For specific indication manners, reference can be made to the indication manner in the formula 2 above, which will not be repeated herein for the sake of simplicity.

In some embodiments, the target PUCCH resource set contains multiple first symbols, and/or, the target PUCCH resource set contains multiple orthogonal cover codes (OCCs). Therefore, it can be ensured that all the K PUCCH resources in the target PUCCH resource set can be supported, and K is the number of PUCCH resources in the PUCCH resource set as defined in a protocol. In addition, an interval between a frequency-domain location of each PUCCH resource in the first hop unit and a frequency-domain location of each PUCCH resource in the second hop unit can be set to be relatively large, so that a maximum gain can be obtained through frequency hopping.

It is to be noted that, the OCC may also be referred to as a time-domain spreading code.

In some embodiments, the target PUCCH resource set contains the multiple first symbols, the number of the multiple first symbols is L, and in each of the multiple first symbols transmission of $$\frac{K}{L}$$

PUCCHs is supported through frequency-division multiplexing and code-division multiplexing, where L is a positive integer, and K is the number of PUCCH resources in the PUCCH resource set as defined in the protocol.

Figure 11:
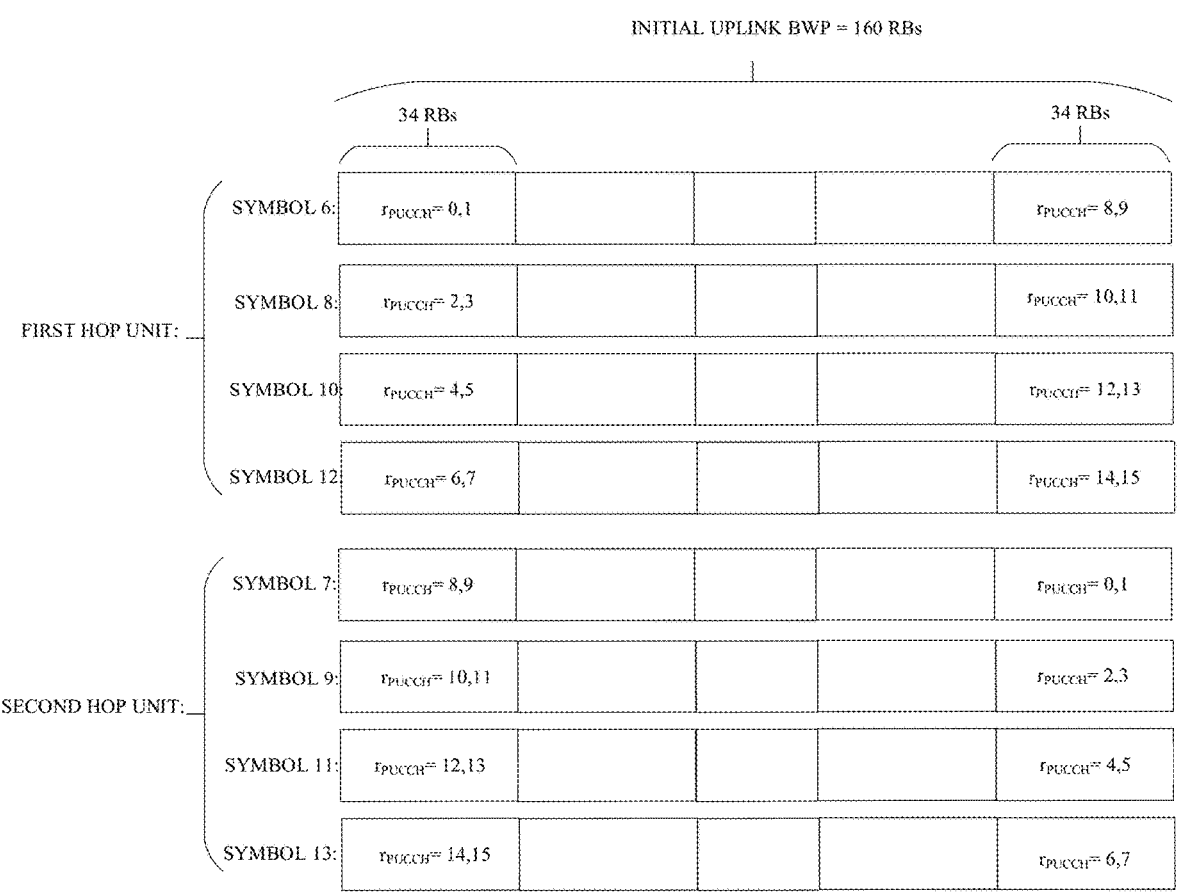

For example, taking index 0 in Table 2 above as an example, K=16, and as illustrated in Table 5, the first symbols {6, 8, 10, 12} are added, and in each of the first symbols transmission of four PUCCHs is supported through frequency-division multiplexing and code-division multiplexing, thereby ensuring that all 16 PUCCH resources in the target PUCCH resource set can be supported. In addition, as illustrated in FIG. 11, an interval between a frequency-domain location of each PUCCH resource in the first hop unit and a frequency-domain location of each PUCCH resource in the second hop unit are relatively large. Therefore, a maximum gain can be obtained through frequency hopping.

TABLE 5

| Index | PUCCH format | First symbol | Number of symbols | PRB offset $R_{BWP}^{offset}$ | Set of initial CS indexes |
|---|---|---|---|---|---|
| 0 | 0 | 6, 8, 10, 12 | 2 | 0 | {0, 3} |

In some embodiments, prior to introduction of time-domain multiplexing, frequency-domain space in the initial uplink BWP can be fully utilized, which can minimize the number of symbols additionally introduced.

Figure 12:
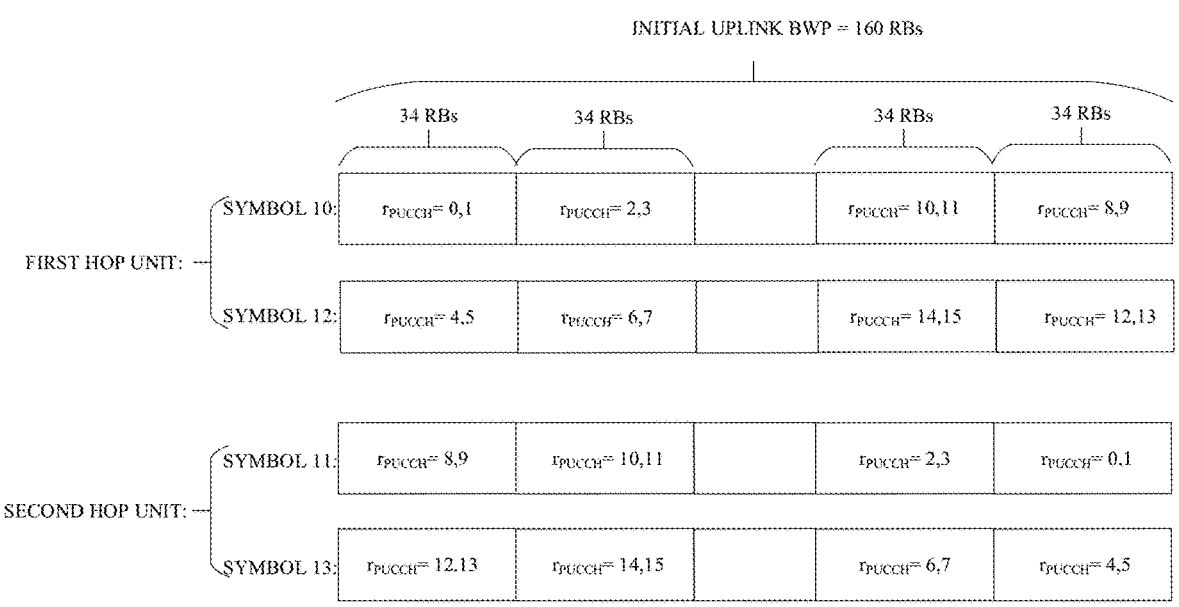

For example, taking index 0 in Table 2 above as an example, K=16, and as illustrated in Table 6, the first symbols {10, 12} are added, and in each of the first symbols, transmission of eight PUCCHs is supported through frequency-division multiplexing and code-division multiplexing, thereby ensuring that all 16 PUCCH resources in the target PUCCH resource set can be supported. In addition, as illustrated in FIG. 12, an interval between a frequency-domain location of each PUCCH resource in the first hop unit and a frequency-domain location of each PUCCH resource in the second hop unit is the largest. Therefore, a maximum gain can be obtained through frequency hopping.

TABLE 6

| Index | PUCCH format | First symbol | Number of symbols | PRB offset $R_{BWP}^{offset}$ | Set of initial CS indexes |
|---|---|---|---|---|---|
| 0 | 0 | 10, 12 | 2 | 0 | {0, 3} |

In some embodiments, the target PUCCH resource set contains the multiple OOCs. The number of the multiple OOCs is S, and in each of the first symbols transmission of $$\frac{K}{S}$$

PUCCHs is supported through frequency-division multiplexing and code-division multiplexing, where S is a positive integer, and K is the number of PUCCH resources in the PUCCH resource set as defined in the protocol. Specifically, for example, K=16, and multiplexing of different users can be implemented by introducing an OOC(s) into PUCCH format 1. Therefore, based on OOC 0, an additional OCC(s) can be introduced to support 16 PUCCH resources.

Figure 13:
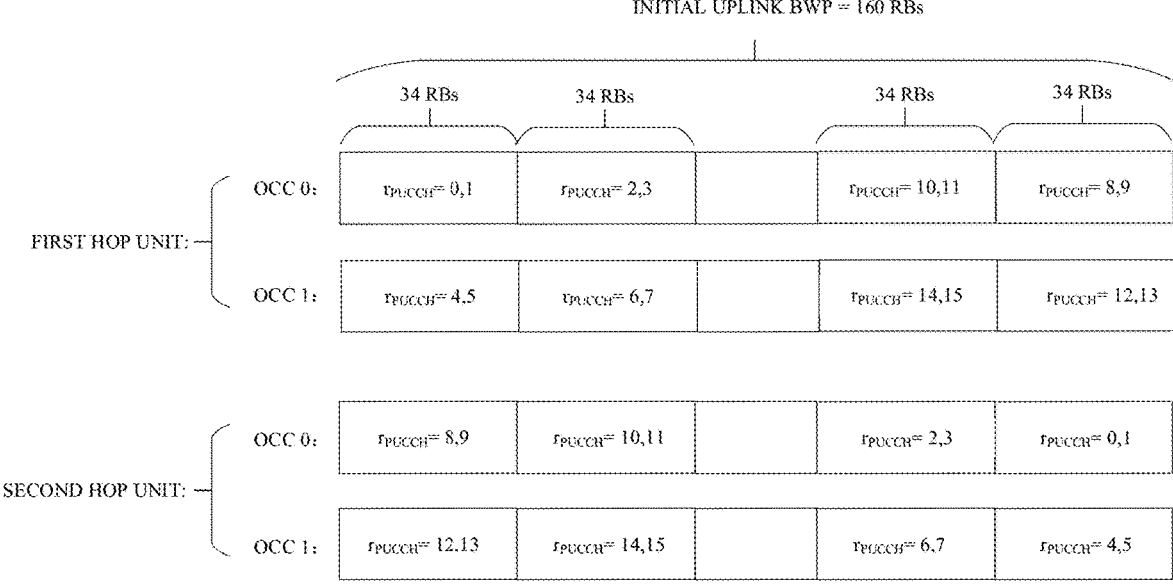

For example, taking index 7 in Table 2 above as an example, K=16, and as illustrated in Table 7, indexes of the OCC {0, 1} are added, and in each of the first symbols transmission of eight PUCCHs is supported through frequency-division multiplexing and code-division multiplexing, thereby ensuring that all 16 PUCCH resources in the target PUCCH resource set can be supported. In this case, as illustrated in FIG. 13, although an interval between a frequency-domain location of each PUCCH resource in the first hop unit and a frequency-domain location of each PUCCH resource in the second hop unit may not be the largest, only one additional OCC index is required.

TABLE 7

| Index | PUCCH format | First symbol | Number of symbols | PRB offset $RB_{BWP}^{offset}$ | Set of initial CS indexes | OCC |
|---|---|---|---|---|---|---|
| 7 | 1 | 4 | 10 | 0 | {0, 6} | 0, 1 |

In some embodiments, considering that the number of time-domain symbols when frequency hopping is used is twice the number of time-domain symbols when frequency hopping is not used, in a case where frequency hopping is not used, respective PUCCH transmissions can be performed through remaining time-domain resources, so that transmission of 16 PUCCHs can be supported.

Figure 14:
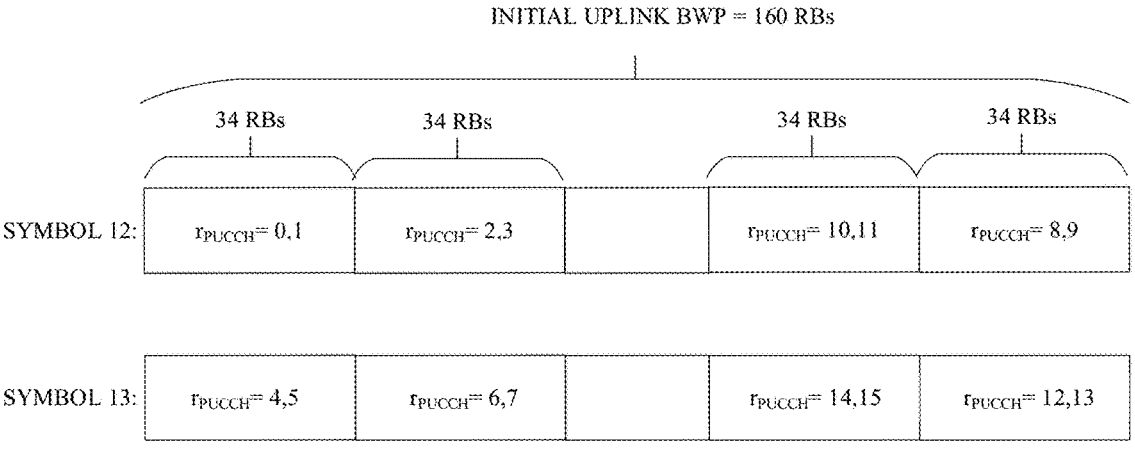

For example, taking index 0 in Table 2 above as an example, K=16. When frequency hopping is used, symbol 12 corresponds to the first hop unit, and symbol 13 corresponds to the second hop unit, and only 8 PUCCH resources can be supported. However, as illustrated in FIG. 14, when frequency hopping is not used, symbol 13 can be used for transmission of other eight PUCCH resources, and thus it can be realized that two symbols can support 16 PUCCH resources.

Embodiments of the disclosure are designed based on the unlicensed band of 60 GHz. However, a scheme for PRB position determination and a scheme for adjusting the number of PUCCH resources in a PUCCH resource set are applicable to a PUCCH transmission on multiple PRBs in any band.

Therefore, in embodiments of the disclosure, the terminal device determines the PRB position of the target PUCCH resource for the PUCCH in the initial uplink BWP, where the target PUCCH resource includes at least one PRB per hop unit, i.e., the target PUCCH resource includes multiple PRBs in multiple hop units. Therefore, transmission of the PUCCH on multiple PRBs can be supported, which can enhance coverage of the transmission of the PUCCH.

The embodiments of the disclosure at the terminal side are described in detail above with reference to FIG. 2 to FIG. 14, and embodiments of the disclosure at the network side will be described in detail below with reference to FIG. 15. It is to be understood that the embodiments at the network side correspond to the embodiments at the terminal side, and for similar illustrations, reference can be made to the embodiments at the terminal side.

Figure 15:
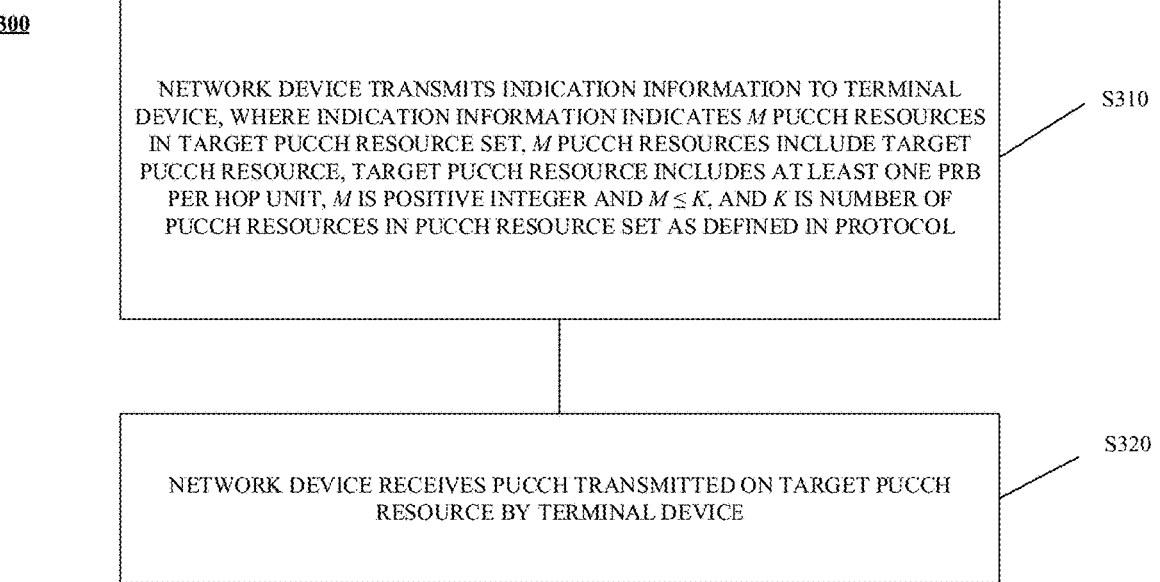
FIG. 15 is a schematic flow chart of a method for wireless communication according to embodiments of the disclosure.

FIG. 15 is a schematic flow chart of a method 300 for wireless communication according to embodiments of the disclosure. As illustrated in FIG. 15, the method 300 for wireless communication may include at least some of the following.

S310, a network device transmits indication information to a terminal device, where the indication information indicates M PUCCH resources in a target PUCCH resource set, the M PUCCH resources include a target PUCCH resource, the target PUCCH resource includes at least one PRB per hop unit, M is a positive integer and M≤K, and K is the number of PUCCH resources in a PUCCH resource set as defined in a protocol.

S320, the network device receives a PUCCH transmitted on the target PUCCH resource by the terminal device.

In some embodiments, different initial uplink BWPs correspond to different values of M, respectively.

In some embodiments, the indication information is transmitted via system information.

In some embodiments, different PUCCH-resource-number indexes correspond to different values of M, respectively, where the PUCCH-resource-number index indicates the number of PUCCH resources in the target PUCCH resource set.

In some embodiments, the indication information is at least one bit in a PUCCH resource indicator field in downlink scheduling signaling.

In some embodiments, the target PUCCH resource set contains multiple first symbols, and/or, the target PUCCH resource set contains multiple OCCs.

In some embodiments, the target PUCCH resource set contains the multiple first symbols, the number of the multiple first symbols is L, and in each of the multiple first symbols transmission of $$\frac{K}{L}$$

PUCCHS is supported through frequency-division multiplexing and code-division multiplexing, where L is a positive integer.

In some embodiments, the target PUCCH resource set contains the multiple OCCs, the number of the multiple OCCs is S, and in each of the first symbols transmission of $$\frac{K}{S}$$

PUCCHs is supported through frequency-division multiplexing and code-division multiplexing, where S is a positive integer.

In some embodiments, considering that the number of time-domain symbols when frequency hopping is used is twice the number of time-domain symbols when frequency hopping is not used, in a case where frequency hopping is not used, respective PUCCH transmissions can be performed through remaining time-domain resources, so that transmission of 16 PUCCHs can be supported.

In some embodiments, the target PUCCH resource is a common PUCCH resource configured for a terminal device in an unconnected state.

In some embodiments, a format of the PUCCH includes one of: PUCCH format 0, PUCCH format 1, and PUCCH format 4.

Therefore, in embodiments of the disclosure, the terminal device determines the PRB position of the target PUCCH resource for the PUCCH in the initial uplink BWP, where the target PUCCH resource includes at least one PRB per hop unit, i.e., the target PUCCH resource includes multiple PRBs in multiple hop units. Therefore, transmission of the PUCCH on multiple PRBs can be supported, which can enhance coverage of the transmission of the PUCCH.

The method embodiments of the disclosure are described in detail above with reference to FIG. 2 to FIG. 15, and apparatus embodiments of the disclosure will be described in detail below with reference to FIG. 16 to FIG. 17. It is to be understood that the apparatus embodiments and the method embodiments correspond to each other, and for similar illustrations, reference can be made to the method embodiments.

FIG. 16 illustrates a schematic block diagram of a terminal device 400 according to embodiments of the disclosure. As illustrated in FIG. 16, the terminal device 400 includes a processing unit 410 and a communication unit 420. The processing unit 410 is configured to determine a PRB position of a target PUCCH resource for a PUCCH in an initial uplink BWP, where the target PUCCH resource includes at least one PRB per hop unit. The communication unit 420 is configured to transmit the PUCCH on the target PUCCH resource.

In some embodiments, the number of PRBs in the target PUCCH resource is determined according to a preset rule.

In some embodiments, the processing unit 410 is specifically configured to determine a first PRB index of the target PUCCH resource in a first hop unit and a second PRB index of the target PUCCH resource in a second hop unit according to at least one of: the number of PRBs in the target PUCCH resource, a PRB offset for the initial uplink BWP, the number of PRBs in the initial uplink BWP, an index of the target PUCCH resource, or the number of initial cyclic shift (CS) indexes in a set of initial CS indexes. The processing unit 410 is further configured to determine the PRB position of the target PUCCH resource in the initial uplink BWP according to the first PRB index, the second PRB index, and the number of PRBs in the target PUCCH resource.

In some embodiments, the first PRB index is a starting PRB index in all PRB indexes of the target PUCCH resource in the first hop unit, or, the first PRB index is a last PRB index in all the PRB indexes of the target PUCCH resource in the first hop unit, or, the first PRB index is an intermediate PRB index in all the PRB indexes of the target PUCCH resource in the first hop unit. And/or, the second PRB index is a starting PRB index in all PRB indexes of the target PUCCH resource in the second hop unit, or, the second PRB index is a last PRB index in all the PRB indexes of the target PUCCH resource in the second hop unit, or, the second PRB index is an intermediate PRB index in all the PRB indexes of the target PUCCH resource in the second hop unit.

In some embodiments, the processing unit 410 is specifically configured to determine the first PRB index as $$N_{RB} * \left( RB_{BWP}^{offset} + \lfloor r_{PUUCH}/(N_{CS}) \rfloor \right)$$

and determine the second PRB index as $$N_{BWP}^{size} - 1 - N_{RB} * \left( RB_{BWP}^{offset} + \lfloor r_{PUUCH}/(N_{CS}) \rfloor \right)$$

when $\lfloor r_{PUUCH}/8 \rfloor = 0$, and/or determine the first PRB index as $$N_{BWP}^{size} - 1 - N_{RB} * \left( RB_{BWP}^{offset} + \lfloor (r_{PUUCH} - 8)/(N_{CS}) \rfloor \right)$$

and determine the second PRB index as $$N_{RB} * \left( RB_{BWP}^{offset} + \lfloor (r_{PUUCH} - 8)/(N_{CS}) \rfloor \right) \text{ when } \lfloor r_{PUUCH}/8 \rfloor = 1.$$

$N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, the processing unit 410 is specifically configured to determine that PRB indexes of the target PUCCH resource in the first hop unit in the initial uplink BWP is from $$N_{PRB}^{start}(0, 1) \text{ to } N_{PRB}^{start}(0, 1) + N_{RB} - 1$$

and determine that PRB indexes of the target PUCCH resource in the second hop unit in the initial uplink BWP is from $$N_{PRB}^{start}(0, 2) - N_{RB} + 1 \text{ to } N_{PRB}^{start}(0, 2)$$

when $\lfloor r_{PUUCH}/8 \rfloor = 0$, and/or determine that the PRB indexes of the target PUCCH resource in the first hop unit in the initial uplink BWP is from $$N_{PRB}^{start}(1, 1) - N_{RB} + 1 \text{ to } N_{PRB}^{start}(1, 1)$$

and determine that the PRB indexes of the target PUCCH resource in the second hop unit in the initial uplink BWP is from $$N_{PRB}^{start}(1, 2) \text{ to } N_{PRB}^{start}(1, 2) + N_{RB} - 1$$

when $\lfloor r_{PUUCH}/8 \rfloor = 1$. $N_{RB}$ is the number of PRBs in the target PUCCH resource, $r_{PUUCH}$ is the index of the target PUCCH resource, $$N_{PRB}^{start}(0, 1)$$

is the first PRB index when $$\lfloor r_{PUUCH}/8 \rfloor = 0, N_{PRB}^{start}(0, 2)$$

is the second PRB index when $$\lfloor r_{PUUCH}/8 \rfloor = 0, N_{PRB}^{start}(1, 1)$$

is the first PRB index when $$\lfloor r_{PUUCH}/8 \rfloor = 1, N_{PRB}^{start}(1, 2)$$

is the second PRB index when $\lfloor r_{PUUCH}/8 \rfloor = 1$, and $\lfloor \ \rfloor$ represents a floor function.

In some embodiments, the processing unit 410 is specifically configured to determine the first PRB index as $$N_{RB}{}^{*}\left(RB_{BWP}^{offset} + \lfloor r_{PUUCH}/(N_{CS}) \rfloor\right)$$

and determine the second PRB index as $$N_{BWP}^{size} - N_{RB}{}^{*}\left(RB_{BWP}^{offset} + \lfloor r_{PUUCH}/(N_{CS}) \rfloor + 1\right)$$

when $\lfloor r_{PUUCH}/8 \rfloor = 0$, and/or determine the first PRB index as $$N_{BWP}^{size} - N_{RB}{}^{*}\left(RB_{BWP}^{offset} + \lfloor (r_{PUUCH} - 8)/(N_{CS}) \rfloor + 1\right)$$

and determine the second PRB index as $$N_{RB}{}^{*}\left(RB_{BWP}^{offset} + \lfloor (r_{PUUCH} - 8)/(N_{CS}) \rfloor\right) \text{ when } \lfloor r_{PUUCH}/8 \rfloor = 1.$$

$N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

In some embodiments, the processing unit 410 is specifically configured to determine that PRB indexes of the target PUCCH resource in the first hop unit in the initial uplink BWP are from $$N_{PRB}^{start}(0, 1) \text{ to } N_{PRB}^{start}(0, 1) + N_{RB} - 1$$

and determine that PRB indexes of the target PUCCH resource in the second hop unit in the initial uplink BWP are from $$N_{PRB}^{start}(0, 2) \text{ to } N_{PRB}^{start}(0, 2) + N_{RB} - 1 \text{ when } \lfloor r_{PUUCH}/8 \rfloor = 0,$$

and/or determine that the PRB indexes of the target PUCCH resource in the first hop unit in the initial uplink BWP are from $$N_{PRB}^{start}(1, 1) \text{ to } N_{PRB}^{start}(1, 1) + N_{RB} - 1$$

and determine that the PRB indexes of the target PUCCH resource in the second hop unit in the initial uplink BWP are from $$N_{PRB}^{start}(1, 2) \text{ to } N_{PRB}^{start}(1, 2) + N_{RB} - 1$$

when $\lfloor r_{PUUCH}/8 \rfloor = 1$. $N_{RB}$ is the number of PRBs in the target PUCCH resource, $r_{PUCCH}$ is the index of the target PUCCH resource, $$N_{PRB}^{start}(0, 1)$$

is the first PRB index when $$\lfloor r_{PUUCH}/8 \rfloor = 0, N_{PRB}^{start}(0, 2)$$

is the second PRB index when $$\lfloor r_{PUUCH}/8 \rfloor = 0, N_{PRB}^{start}(1, 1)$$

is the first PRB index when $$\lfloor r_{PUUCH}/8 \rfloor = 1, N_{PRB}^{start}(1, 2)$$

is the second PRB index when $\lfloor r_{PUUCH}/8 \rfloor = 1$, and $\lfloor \rfloor$ represents a floor function.

In some embodiments, the processing unit 410 is further configured to determine the target PUCCH resource from M PUCCH resources in a target PUCCH resource set, where M is a positive integer and M≤K, and K is the number of PUCCH resources in the target PUCCH resource set as defined in a protocol.

In some embodiments, the processing unit 410 is further configured to determine the M PUCCH resources in the target PUCCH resource set according to at least one of: the number of PRBs in the target PUCCH resource, the PRB offset for the initial uplink BWP, the number of PRBs in the initial uplink BWP, or the number of initial CS indexes in the set of initial CS indexes.

In some embodiments, the processing unit 410 is specifically configured to determine that M is equal to $R_{PUCCH}$, where $$R_{PUCCH} = N_{CS}{}^* \lfloor (N_{BWP}^{size} - RB_{BWP}^{offset})/N_{RB} \rfloor,$$

or $$R_{PUCCH} = N_{CS}{}^* \lceil (N_{BWP}^{size} - RB_{BWP}^{offset})/N_{RB} \rceil;$$

and determine, according to $R_{PUCCH}$, the M PUCCH resources from K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, $\lfloor \rfloor$ represents a floor function, and $\lceil \rceil$ represents a ceiling function.

In some embodiments, the processing unit 410 is specifically configured to determine first M PUCCH resources in the K PUCCH resources in the target PUCCH resource set that are defined in the protocol as the M PUCCH resources.

In some embodiments, when $$R_{PUCCH} = N_{CS}{}^* \lceil (N_{BWP}^{size} - RB_{BWP}^{offset})/N_{RB} \rceil,$$

the number of PRBs in each of PUCCH resources with resource indexes from 0 to $R_{PUCCH}-N_{CS}-1$ in the M PUCCH resources is $N_{RB}$, and the number of PRBs in each of PUCCH resources with resource indexes from $R_{PUCCH}-N_{CS}$ to $R_{PUCCH}-1$ in the M PUCCH resources is $$(N_{BWP}^{size}) \bmod N_{RB},$$

where mod represents a modulo operation.

In some embodiments, the number of PRBs in each of the M PUCCH resources is $$N_{RB} \text{ when } R_{PUCCH} = N_{CS}{}^* \lfloor (N_{BWP}^{size} - RB_{BWP}^{offset})/N_{RB} \rfloor.$$

In some embodiments, the processing unit 410 is specifically configured to: determine that M is equal to $R_{PUCCH}$, or, determine that M is $R_{PUCCH}+2^*N_{CS}$, where $$R_{PUCCH} = N_{CS}{}^* \lfloor (N_{BWP}^{size} - RB_{BWP}^{offset})/N_{RB} \rfloor,$$

and $R_{PUCCH}$ is further adjusted to be a multiple of $2^*N_{CS}$ by rounding down a calculation result; and determine the M PUCCH resources from the K PUCCH resources in the target PUCCH resource set that are defined in the protocol. $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor\ \rfloor$ represents a floor function.

In some embodiments, the processing unit 410 is specifically configured to determine first M PUCCH resources in the K PUCCH resources in the target PUCCH resource set that are defined in the protocol as the M PUCCH resources.

In some embodiments, in the case where the terminal device determines that M is equal to $R_{PUCCH}$, and $R_{PUCCH}$ is further adjusted to be the multiple of $2*N_{CS}$ by rounding down the calculation result, when $\lfloor r_{PUUCH}/R\rfloor=0$, an index of a first PRB in the target PUCCH resource in a first hop unit is $$N_{RB}*(RB_{BWP}^{offset}+\lfloor r_{PUUCH}/(N_{CS})\rfloor),$$

and an index of a first PRB in the target PUCCH resource in a second hop unit is $$N_{BWP}^{size}-1-N_{RB}*(RB_{BWP}^{offset}+\lfloor r_{PUUCH}/(N_{CS})\rfloor);$$

and/or when $\lfloor r_{PUUCH}/R\rfloor=1$, the index of the first PRB in the target PUCCH resource in the first hop unit is $$N_{BWP}^{size}-1-N_{RB}*(RB_{BWP}^{offset}+\lfloor(r_{PUUCH}-R)/(N_{CS})\rfloor),$$

and the terminal device determines that the index of the first PRB in the target PUCCH resource in the second hop unit is $$N_{RB}*(RB_{BWP}^{offset}+\lfloor(r_{PUUCH}-R)/(N_{CS})\rfloor).$$
$$R=R_{PUCCH}/2.$$

In some embodiments, when the terminal device determines that M is $R_{PUCCH}+2*N_{CS}$, and $R_{PUCCH}$ is further adjusted to be the multiple of $2*N_{CS}$ by rounding down the calculation result, the number of PRBs in each of PUCCH resources with resource indexes from 0 to $R-N_{CS}-1$ in the M PUCCH resources is $N_{RB}$, the number of PRBs in each of PUCCH resources with resource indexes from R to $R_{PUCCH}+N_{CS}-1$ in the M PUCCH resources is $N_{RB}$, the number of PRBs in each of PUCCH resources with resource indexes from $R-N_{CS}$ to $R-1$ in the M PUCCH resources is $$((N_{BWP}^{size})\bmod N_{RB})/2,$$

and the number of PRBs in each of PUCCH resources with resource indexes from $R_{PUCCH}+N_{CS}$ to $R_{PUCCH}+2N_{CS}-1$ in the M PUCCH resources is $$((N_{BWP}^{size})\bmod N_{RB})/2,\text{ where }R=(R_{PUCCH}+2*N_{CS})/2,$$

and mod represents a modulo operation.

In some embodiments, the processing unit 410 is specifically configured to determine that the M PUCCH resources include: first M/2 PUCCH resources in first K/2 PUCCH resources in the K PUCCH resources in the target PUCCH resource set that are defined in the protocol, and first M/2 PUCCH resources in last K/2 PUCCH resources in the K PUCCH resources in the target PUCCH resource set that are defined in the protocol.

In some embodiments, when the terminal device determines that M is $R_{PUCCH}+2*N_{CS}$, and $R_{PUCCH}$ is further adjusted to be the multiple of $2*N_{CS}$ by rounding down the calculation result, the number of PRBs in each of PUCCH resources with resource indexes from 0 to $R_{PUCCH}/2-1$ in the M PUCCH resources is $N_{RB}$, the number of PRBs in each of PUCCH resources with resource indexes from K/2 to $K/2+R_{PUCCH}/2-1$ in the M PUCCH resources is $N_{RB}$, the number of PRBs in each of PUCCH resources with resource indexes from $R_{PUCCH}/2$ to $R_{PUCCH}/2+N_{CS}-1$ in the M PUCCH resources is $$((N_{BWP}^{size})\bmod N_{RB})/2,$$

and the number of PRBs in each of PUCCH resources with resource indexes from $K/2+R_{PUCCH}/2$ to $K/2+R_{PUCCH}/2+N_{CS}-1$ in the M PUCCH resources is $$((N_{BWP}^{size})\bmod N_{RB})/2,$$

where mod represents a modulo operation.

In some embodiments, the number of PRBs in each of the M PUCCH resources is $N_{RB}$ when the terminal device determines that M is equal to $R_{PUCCH}$ and $R_{PUCCH}$ is further adjusted to be the multiple of $2*N_{CS}$ by rounding down the calculation result.

In some embodiments, a value of M is pre-configured or specified in the protocol.

In some embodiments, different initial uplink BWPs correspond to different values of M, respectively.

In some embodiments, a value of M is configured by a network device via system information.

In some embodiments, different PUCCH-resource-number indexes correspond to different values of M, respectively, where the PUCCH-resource-number index indicates the number of PUCCH resources in the target PUCCH resource set.

In some embodiments, the value of M is indicated by the network device via at leas one bit in a PUCCH resource indicator field in downlink scheduling signaling.

In some embodiments, the target PUCCH resource set contains multiple first symbols, and/or, the target PUCCH resource set contains multiple OCCs.

In some embodiments, the target PUCCH resource set contains the multiple first symbols, the number of the multiple first symbols is L, and in each of the multiple first symbols transmission of $$\frac{K}{L}$$

PUCCHs is supported through frequency-division multiplexing and code-division multiplexing, where L is a positive integer, and K is the number of PUCCH resources in the target PUCCH resource set as defined in the protocol.

In some embodiments, the target PUCCH resource set contains the multiple OCCs, the number of the multiple OCCs is S, and in each of the first symbols transmission of $$\frac{K}{S}$$

PUCCHs is supported through frequency-division multiplexing and code-division multiplexing, where S is a positive integer, and K is the number of PUCCH resources in the target PUCCH resource set as defined in the protocol.

In some embodiments, the target PUCCH resource is a common PUCCH resource configured for a terminal device in an unconnected state.

In some embodiments, the processing unit 410 is further configured to determine an index of the target PUCCH resource from a target PUCCH resource set according to the following formula:

$$r_{PUCCH} = \left\lfloor \frac{2 \cdot n_{CCE,0}}{N_{CCE}} \right\rfloor + 2 \cdot \Delta_{PRI} \cdot r_{PUCCH}$$

is the index of the target PUCCH resource, $N_{CCE}$ is the number of CCEs in a CORESET for reception of downlink scheduling signaling by the terminal device, $n_{CCE,0}$ is an index of a first CCE for reception of the downlink scheduling signaling by the terminal device, and $\Delta_{PRI}$ is a value of a PUCCH resource indicator field in the downlink scheduling signaling.

In some embodiments, a format of the PUCCH includes one of: PUCCH format 0, PUCCH format 1, and PUCCH format 4.

In some embodiments, the communication unit above may be a communication interface or a transceiver, or may be an input/output interface of a communication chip or a system-on-chip (SOC). The processing unit above may be one or more processors.

It is to be understood that, the terminal device 400 according to embodiments of the disclosure may correspond to the terminal device in the method embodiments of the disclosure, and the foregoing and other operations and/or functions of various units in the terminal device 400 are respectively intended for implementing corresponding procedures of the terminal device in the method 200 for wireless communication illustrated in FIG. 2 to FIG. 14, which will not be repeated herein for the sake of simplicity.

FIG. 17 illustrates a schematic block diagram of a network device 500 according to embodiments of the disclosure. As illustrated in FIG. 17, the network device 500 includes a communication unit 510. The communication unit 510 is configured to transmit indication information to a terminal device, where the indication information indicates M PUCCH resources in a target PUCCH resource set, the M PUCCH resources include a target PUCCH resource, the target PUCCH resource includes at least one PRB per hop unit, M is a positive integer and M≤K, and K is the number of PUCCH resources in a PUCCH resource set as defined in a protocol. The communication unit 510 is further configured to receive a PUCCH transmitted on the target PUCCH resource by the terminal device.

In some embodiments, different initial uplink BWPs correspond to different values of M.

In some embodiments, the indication information is transmitted via system information.

In some embodiments, different PUCCH-resource-number indexes correspond to different values of M, respectively, where the PUCCH-resource-number index indicates the number of PUCCH resources in the target PUCCH resource set.

In some embodiments, the indication information is at least one bit in a PUCCH resource indicator field in downlink scheduling signaling.

In some embodiments, the target PUCCH resource set contains multiple first symbols, and/or, the target PUCCH resource set contains multiple OCCs.

In some embodiments, the target PUCCH resource set contains the multiple first symbols, the number of the multiple first symbols is L, and in each of the multiple first symbols transmission of $$\frac{K}{L}$$

PUCCHs is supported through frequency-division multiplexing and code-division multiplexing, where L is a positive integer.

In some embodiments, the target PUCCH resource set contains the multiple OCCs, the number of the multiple OCCs is S, and in each of the first symbols transmission of $$\frac{K}{S}$$

PUCCHs is supported through frequency-division multiplexing and code-division multiplexing, where S is a positive integer.

In some embodiments, the target PUCCH resource is a common PUCCH resource configured for a terminal device in an unconnected state.

In some embodiments, a format of the PUCCH includes one of: PUCCH format 0, PUCCH format 1, and PUCCH format 4.

In some embodiments, the communication unit above may be a communication interface or a transceiver, or may be an input/output interface of a communication chip or an SOC.

It is to be understood that, the network device 500 according to embodiments of the disclosure may correspond to the network device in the method embodiments of the disclosure, and the foregoing and other operations and/or functions of various units in the network device 500 are respectively intended for implementing corresponding procedures of the network device in the method 300 for wireless communication illustrated in FIG. 15, which will not be repeated herein for the sake of simplicity.

FIG. 18 is a schematic structural diagram of a communication device 600 provided in embodiments of the disclosure. The communication device 600 illustrated in FIG. 18 includes a processor 610. The processor 610 can invoke and execute a computer program stored in a memory, so as to implement the method in embodiments of the disclosure.

In some embodiments, as illustrated in FIG. 18, the communication device 600 may further include a memory 620. The processor 610 can invoke and execute a computer program stored in the memory 620, so as to implement the method in embodiments of the disclosure.

The memory 620 may be a separate device independent of the processor 610, or may be integrated into the processor 610.

In some embodiments, as illustrated in FIG. 18, the communication device 600 may further include a transceiver 630. The processor 610 can control the transceiver 630 to communicate with other devices, specifically, to transmit information or data to other devices or to receive information or data from other devices.

The transceiver 630 may include a transmitter and a receiver. The transceiver 630 may further include an antenna, where one or more antennas may be provided.

In some embodiments, the communication device 600 may specifically be the network device in embodiments of the disclosure, and the communication device 600 may implement corresponding operations implemented by the network device in various methods in embodiments of the disclosure, which will not be repeated herein for the sake of simplicity.

In some embodiments, the communication device 600 may specifically be the terminal device in embodiments of the disclosure, and the communication device 600 may implement corresponding operations implemented by the terminal device in various methods in embodiments of the disclosure, which will not be repeated herein for the sake of simplicity.

Figure 19:
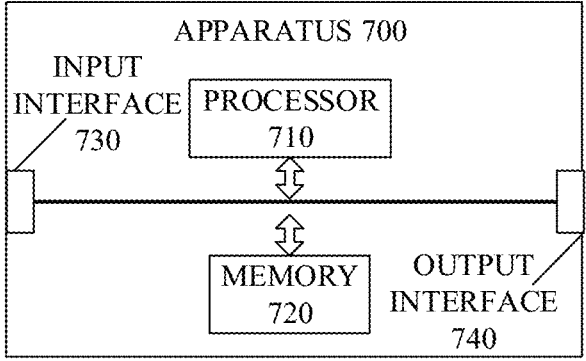
FIG. 19 is a schematic block diagram of an apparatus according to embodiments of the disclosure.

FIG. 19 is a schematic structural diagram of an apparatus according to embodiments of the disclosure. The apparatus 700 illustrated in FIG. 19 includes a processor 710. The processor 710 can invoke and execute a computer program stored in a memory, so as to implement the method in embodiments of the disclosure.

In some embodiments, as illustrated in FIG. 19, the apparatus 700 may further include a memory 720. The processor 710 can invoke and execute a computer program stored in the memory 720, so as to implement the method in embodiments of the disclosure.

The memory 720 may be a separate device independent of the processor 710, or may be integrated into the processor 710.

In some embodiments, the apparatus 700 may further include an input interface 730. The processor 710 can control the input interface 730 to communicate with other devices or chips, and specifically, to obtain information or data transmitted by other devices or chips.

In some embodiments, the apparatus 700 may further include an output interface 740. The processor 710 can control the output interface 740 to communicate with other devices or chips, and specifically, to output information or data to other devices or chips.

In some embodiments, the apparatus may be applied to the network device in embodiments of the disclosure, and the apparatus may implement corresponding operations implemented by the network device in various methods in embodiments of the disclosure, which will not be repeated herein for the sake of simplicity.

In some embodiments, the apparatus may be applied to the terminal device in embodiments of the disclosure, and the apparatus may implement corresponding operations implemented by the terminal device in various methods in embodiments of the disclosure, which will not be repeated herein for the sake of simplicity.

In some embodiments, the apparatus in embodiments of the disclosure may also be a chip, for example, a system-on-a-chip (SoC).

Figure 20:
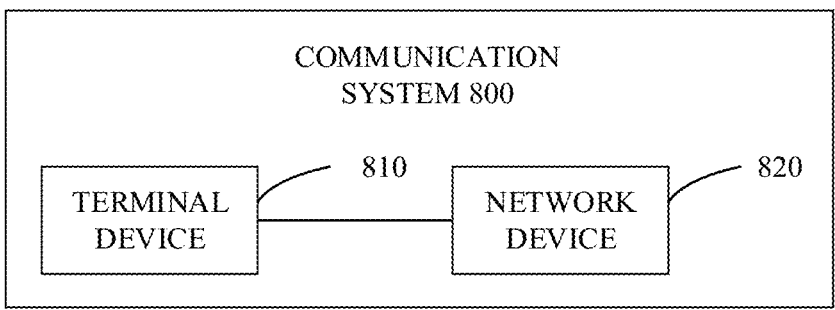
FIG. 20 is a schematic block diagram of a communication system according to embodiments of the disclosure.

FIG. 20 is a schematic block diagram of a communication system 800 provided in embodiments of the disclosure. As illustrated in FIG. 20, the communication system 800 includes a terminal device 810 and a network device 820.

The terminal device 810 may be configured to implement corresponding functions implemented by the terminal device in the foregoing methods, and the network device 820 may be configured to implement corresponding functions implemented by the network device in the foregoing methods, which will not be repeated herein for the sake of simplicity.

It is to be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium mature in the skill such as a random access memory (RAM), a flash memory, a read-only memory (ROM), a programmable ROM (PROM), or an electrically erasable programmable memory, registers, and the like. The storage medium is located in the memory. The processor reads the information in the memory, and completes the steps of the method described above with the hardware of the processor.

It is to be understood that, the memory in embodiments of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory may be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It is to be noted that, the memory of the systems and methods described in the disclosure is intended to include, but is not limited to, these and any other suitable types of memory.

It is to be understood that, the memory above is intended for illustration rather than limitation. For example, the memory in embodiments of the disclosure may also be an SRAM, a DRAM, an SDRAM, a DDR SDRAM, an ESDRAM, an SLDRAM, a DR RAM, etc. In other words, the memory in embodiments of the disclosure is intended to include, but is not limited to, these and any other suitable types of memory.

Embodiments of the disclosure further provide a computer-readable storage medium. The computer-readable storage medium is configured to store a computer program.

In some embodiments, the computer-readable storage medium may be applied to the network device in embodiments of the disclosure, and the computer program is operable with a computer to execute corresponding operations implemented by the network device in various methods in embodiments of the disclosure, which will not be repeated herein for the sake of brevity.

In some embodiments, the computer-readable storage medium may be applied to the terminal device in embodiments of the disclosure, and the computer program is operable with a computer to execute corresponding operations implemented by the terminal device in various methods in embodiments of the disclosure, which will not be repeated herein for the sake of brevity.

Embodiments of the disclosure further provide a computer program product. The computer program product includes computer program instructions.

In some embodiments, the computer program product may be applied to the network device in embodiments of the disclosure, and the computer program instructions are operable with a computer to execute corresponding operations implemented by the network device in various methods in embodiments of the disclosure, which will not be repeated herein for the sake of brevity.

In some embodiments, the computer program product may be applied to the terminal device in embodiments of the disclosure, and the computer program instructions are operable with a computer to execute corresponding operations implemented by the terminal device in various methods in embodiments of the disclosure, which will not be repeated herein for the sake of brevity.

Embodiments of the disclosure further provide a computer program.

In some embodiments, the computer program may be applied to the network device in embodiments of the disclosure. The computer program, when executed by a computer, is operable with the computer to implement corresponding operations implemented by the network device in various methods in embodiments of the disclosure, which will not be repeated herein for the sake of brevity.

In some embodiments, the computer program may be applied to the terminal device in embodiments of the disclosure. The computer program, when executed by a computer, is operable with the computer to implement corresponding operations implemented by the terminal device in various methods in embodiments of the disclosure, which will not be repeated herein for the sake of brevity.

It will be appreciated by those of ordinary skill in the art that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, an ROM, an RAM, a magnetic disk, or an optical disk.

The foregoing elaborations are merely embodiments of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A method for physical uplink control channel (PUCCH) transmission, comprising:

determining, by a terminal device, a physical resource block (PRB) position of a target PUCCH resource for a PUCCH in an initial uplink bandwidth part (BWP), the target PUCCH resource comprising at least one PRB per hop unit; and transmitting, by the terminal device, the PUCCH on the target PUCCH resource;

wherein determining, by the terminal device, the PRB position of the target PUCCH resource for the PUCCH in the initial uplink BWP comprises:

determining, by the terminal device, a first PRB index of the target PUCCH resource in a first hop unit and a second PRB index of the target PUCCH resource in a second hop unit according to at least one of: a number of PRBs in the target PUCCH resource, a PRB offset for the initial uplink BWP, a number of PRBs in the initial uplink BWP, an index of the target PUCCH resource, or a number of initial cyclic shift (CS) indexes in a set of initial CS indexes; and determining, by the terminal device, the PRB position of the target PUCCH resource in the initial uplink BWP according to the first PRB index, the second PRB index, and the number of PRBs in the target PUCCH resource.

2. The method of claim 1, wherein determining, by the terminal device, the PRB position of the target PUCCH resource in the initial uplink BWP according to the first PRB index, the second PRB index, and the number of PRBs in the target PUCCH resource comprises:

when $\lfloor r_{PUUCH}/8 \rfloor = 0$, determining, by the terminal device, that PRB indexes of the target PUCCH resource in the first hop unit in the initial uplink BWP are from $$N_{PRB}^{start}(0, 1)$$

to $$N_{PRB}^{start}(0, 1) + N_{RB} - 1,$$

and determining, by the terminal device, that PRB indexes of the target PUCCH resource in the second hop unit in the initial uplink BWP are from $$N_{PRB}^{start}(0, 2) \text{ to } N_{PRB}^{start}(0, 2) + N_{RB} - 1;$$

and/or when $\lfloor r_{PUUCH}/8 \rfloor = 1$, determining, by the terminal device, that the PRB indexes of the target PUCCH resource in the first hop unit in the initial uplink BWP are from $$N_{PRB}^{start}(1, 1)$$

to $$N_{PRB}^{start}(1, 1) + N_{RB} - 1,$$

and determining, by the terminal device, that PRB indexes of the target PUCCH resource in the second hop unit in the initial uplink BWP are from $$N_{PRB}^{start}(1, 2) \text{ to } N_{PRB}^{start}(1, 2) + N_{RB} - 1;$$

wherein $N_{RB}$ is the number of PRBs in the target PUCCH resource, $r_{PUUCH}$ is the index of the target PUCCH resource, $$N_{PRB}^{start}(0, 1)$$

is the first PRB index when $$\lfloor r_{PUUCH}/8 \rfloor = 0, N_{PRB}^{start}(0, 2)$$

is the second PRB index when $$\lfloor r_{PUUCH}/8 \rfloor = 0, N_{PRB}^{start}(1, 1)$$

is the first PRB index when $$\lfloor r_{PUUCH}/8 \rfloor = 1, N_{PRB}^{start}(1, 2)$$

is the second PRB index when $\lfloor r_{PUUCH}/8 \rfloor = 1$, and $\lfloor \ \rfloor$ represents a floor function.

3. The method of claim 1, wherein:

the first PRB index is a starting PRB index in all PRB indexes of the target PUCCH resource in the first hop unit, or, the first PRB index is a last PRB index in all the PRB indexes of the target PUCCH resource in the first hop unit, or, the first PRB index is an intermediate PRB index in all the PRB indexes of the target PUCCH resource in the first hop unit; and/or the second PRB index is a first PRB index in all PRB indexes of the target PUCCH resource in the second hop unit, or, the second PRB index is a last PRB index in all the PRB indexes of the target PUCCH resource in the second hop unit, or, the second PRB index is an intermediate PRB index in all the PRB indexes of the target PUCCH resource in the second hop unit.

4. The method of claim 1, wherein determining, by the terminal device, the first PRB index of the target PUCCH resource in the first hop unit and the second PRB index of the target PUCCH resource in the second hop unit according to at least one of: the number of PRBs in the target PUCCH resource, the PRB offset for the initial uplink BWP, the number of PRBs in the initial uplink BWP, the index of the target PUCCH resource, or the number of initial CS indexes in the set of initial CS indexes comprises:

when $\lfloor r_{PUUCH}/8 \rfloor = 0$, determining, by the terminal device, the first PRB index as $$N_{RB}^*\left(RB_{BWP}^{offset} + \lfloor r_{PUUCH}/(N_{CS}) \rfloor\right),$$

and determining, by the terminal device, the second PRB index as $$N_{BWP}^{size} - 1 - N_{RB}^*\left(RB_{BWP}^{offset} + \lfloor r_{PUUCH}/(N_{CS}) \rfloor\right);$$

and/or when $\lfloor r_{PUUCH}/8 \rfloor = 1$, determining, by the terminal device, the first PRB index as $$N_{BWP}^{size} - 1 - N_{RB}{}^{*}\left(RB_{BWP}^{offset} + \lfloor (r_{PUUCH} - 8)/(N_{CS}) \rfloor\right),$$

and determining, by the terminal device, the second PRB index as $$N_{RB}{}^{*}\left(RB_{BWP}^{offset} + \lfloor (r_{PUUCH} - 8)/(N_{CS}) \rfloor\right);$$

wherein $N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor\ \rfloor$ represents a floor function.

5. The method of claim 1, wherein determining, by the terminal device, the PRB position of the target PUCCH resource in the initial uplink BWP according to the first PRB index, the second PRB index, and the number of PRBs in the target PUCCH resource comprises:

when $\lfloor r_{PUUCH}/8 \rfloor = 0$, determining, by the terminal device, that PRB indexes of the target PUCCH resource in the first hop unit in the initial uplink BWP are from $$N_{PRB}^{start}(0, 1) \text{ to } N_{PRB}^{start}(0, 1) + N_{RB} - 1,$$

and determining, by the terminal device, that PRB indexes of the target PUCCH resource in the second hop unit in the initial uplink BWP are from $$N_{PRB}^{start}(0, 2) - N_{RB} + 1 \text{ to } N_{PRB}^{start}(0, 2);$$

and/or when $\lfloor r_{PUUCH}/8 \rfloor = 1$, determining, by the terminal device, that the PRB indexes of the target PUCCH resource in the first hop unit in the initial uplink BWP are from $$N_{PRB}^{start}(1, 1) - N_{RB} + 1 \text{ to } N_{PRB}^{start}(1, 1),$$

and determining, by the terminal device, that the PRB indexes of the target PUCCH resource in the second hop unit in the initial uplink BWP are from $$N_{PRB}^{start}(1, 2) \text{ to } N_{PRB}^{start}(1, 2) + N_{RB} - 1;$$

wherein $N_{RB}$ is the number of PRBs in the target $r_{PUCCH}$ resource, r PUUCH is the index of the target PUCCH resource, $$N_{PRB}^{start}(0, 1)$$

is the first PRB index when $$\lfloor r_{PUUCH}/8 \rfloor = 0, N_{PRB}^{start}(0, 2)$$

is the second PRB index when $$\lfloor r_{PUUCH}/8 \rfloor = 0, N_{PRB}^{start}(1, 1)$$

is the first PRB index when $$\lfloor r_{PUUCH}/8 \rfloor = 1, N_{PRB}^{start}(1, 2)$$

is the second PRB index when $\lfloor r_{PUUCH}/8 \rfloor = 1$, and $\lfloor\ \rfloor$ represents a floor function.

6. The method of claim 1, wherein determining, by the terminal device, the first PRB index of the target PUCCH resource in the first hop unit and the second PRB index of the target PUCCH resource in the second hop unit according to at least one of: the number of PRBs in the target PUCCH resource, the PRB offset for the initial uplink BWP, the number of PRBs in the initial uplink BWP, the index of the target PUCCH resource, or the number of initial CS indexes in the set of initial CS indexes comprises:

when $\lfloor r_{PUUCH}/8 \rfloor = 1$, determining, by the terminal device, the first PRB index as $$N_{RB} * \left(RB_{BWP}^{offset} + \lfloor r_{PUUCH}/(N_{CS}) \rfloor\right),$$

and determining, by the terminal device, the second PRB index as $$N_{BWP}^{size} - N_{RB} * \left(RB_{BWP}^{offset} + \lfloor r_{PUUCH}/(N_{CS}) \rfloor + 1\right);$$

and/or when $\lfloor r_{PUUCH}/8 \rfloor = 1$, determining, by the terminal device, the first PRB index as $$N_{BWP}^{size} - N_{RB} * \left(RB_{BWP}^{offset} + \lfloor (r_{PUUCH} - 8)/(N_{CS}) \rfloor + 1\right),$$

45 and determining, by the terminal device, the second PRB index as $$N_{RB} * \left( RB_{BWP}^{offset} + \lfloor (r_{PUUCH} - 8)/(N_{CS}) \rfloor \right);$$

wherein $N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

7. The method of claim 1, further comprising:

determining, by the terminal device, the target PUCCH resource from M PUCCH resources in a target PUCCH resource set, wherein M is a positive integer and M≤K, and K is a number of PUCCH resources in the target PUCCH resource set as defined in a protocol.

8. The method of claim 7, wherein a value of M is configured by a network device via system information, and different PUCCH-resource-number indexes correspond to different values of M, respectively, wherein the PUCCH-resource-number index indicates the number of PUCCH resources in the target PUCCH resource set.

9. The method of claim 7, further comprising:

determining, by the terminal device, the M PUCCH resources in the target PUCCH resource set according to at least one of: a number of PRBs in the target PUCCH resource, a PRB offset for the initial uplink BWP, a number of PRBs in the initial uplink BWP, or a number of initial CS indexes in a set of initial CS indexes.

10. The method of claim 9, wherein determining, by the terminal device, the M PUCCH resources in the target PUCCH resource set according to at least one of: the number of PRBs in the target PUCCH resource, the PRB offset for the initial uplink BWP, the number of PRBs in the initial uplink BWP, or the number of initial CS indexes in the set of initial CS indexes comprises:

determining, by the terminal device, that M is equal to $R_{PUCCH}$, wherein $$R_{PUCCH} = N_{CS} * \lfloor \left( N_{BWP}^{size} - RB_{BWP}^{offset} \right) / N_{RB} \rfloor, \text{ or}$$
$$R_{PUCCH} = N_{CS} * \lceil \left( N_{BWP}^{size} - RB_{BWP}^{offset} \right) / N_{RB} \rceil;$$

and determining, by the terminal device according to $R_{PUCCH}$, the M PUCCH resources from K PUCCH resources in the target PUCCH resource set that are defined in the protocol;

wherein $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, $\lfloor \ \rfloor$ represents a floor function, and $\lceil \ \rceil$ represents a ceiling function.

11. The method of claim 9, wherein determining, by the terminal device, the M PUCCH resources in the target PUCCH resource set according to at least one of: the number of PRBs in the target PUCCH resource, the PRB offset for the initial uplink BWP, the number of PRBs in the initial uplink BWP, or the number of initial CS indexes in the set of initial CS indexes comprises:

determining, by the terminal device, that M is equal to $R_{PUCCH}$, or, determining, by the terminal device, that M is $R_{PUCCH}+2*N_{CS}$, wherein $$R_{PUCCH} = N_{CS} * \lfloor \left( N_{BWP}^{size} - RB_{BWP}^{offset} \right) / N_{RB} \rfloor,$$

and $R_{PUCCH}$ is further adjusted to be a multiple of $2*N_{CS}$ by rounding down a calculation result; and determining, by the terminal device, the M PUCCH resources from the K PUCCH resources in the target PUCCH resource set that are defined in the protocol;

wherein $N_{RB}$ is the number of PRBs in the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

12. A network device, comprising:

a transceiver;

a processor coupled to the transceiver; and a memory configured to store a computer program;

wherein the computer program is executed by the processor to cause the network device to:

receive a physical uplink control channel (PUCCH) on a target PUCCH resource in an initial uplink bandwidth part (BWP), the target PUCCH resource comprising at least one physical resource block (PRB) per hop unit;

wherein a PRB position of the target PUCCH resource in the initial uplink BWP is determined according to a first PRB index of the target PUCCH resource in a first hop unit, a second PRB index of the target PUCCH resource in a second hop unit, and a number of PRBs in the target PUCCH resource;

wherein the first PRB index and the second PRB index are determined according to at least one of: the number of PRBs in the target PUCCH resource, a PRB offset for the initial uplink BWP, a number of PRBs in the initial uplink BWP, an index of the target PUCCH resource, or a number of initial cyclic shift (CS) indexes in a set of initial CS indexes.

13. A terminal device, comprising:

a transceiver;

a processor coupled to the transceiver; and a memory configured to store a computer program;

wherein the computer program is executed by the processor to cause the terminal device to:

determine a physical resource block (PRB) position of a target physical uplink control channel (PUCCH) resource for a PUCCH in an initial uplink bandwidth part (BWP), the target PUCCH resource comprising at least one PRB per hop unit; and transmit the PUCCH on the target PUCCH resource;

wherein the computer program executed by the processor to cause the terminal device to determine the PRB position of the target PUCCH resource for the PUCCH in the initial uplink BWP is executed by the processor to cause the terminal device to:

determine a first PRB index of the target PUCCH resource in a first hop unit and a second PRB index of the target PUCCH resource in a second hop unit according to at least one of: a number of PRBs in the target PUCCH resource, a PRB offset for the initial uplink BWP, a number of PRBs in the initial uplink BWP, an index of the target PUCCH resource, or a number of initial cyclic shift (CS) indexes in a set of initial CS indexes; and determine the PRB position of the target PUCCH resource in the initial uplink BWP according to the first PRB index, the second PRB index, and the number of PRBs in the target PUCCH resource.

14. The terminal device of claim 13, wherein the computer program executed by the processor to cause the terminal device to determine the PRB position of the target PUCCH resource in the initial uplink BWP according to the first PRB index, the second PRB index, and the number of PRBs in the target PUCCH resource is executed by the processor to cause the terminal device to:

determine that PRB indexes of the target PUCCH resource in the first hop unit in the initial uplink BWP range from $$N_{PRB}^{start}(0, 1) \text{ to } N_{PRB}^{start}(0, 1) + N_{RB} - 1$$

and determine that PRB indexes of the target PUCCH resource in the second hop unit in the initial uplink BWP range from $$N_{PRB}^{start}(0, 2) \text{ to } N_{PRB}^{start}(0, 2) + N_{RB} - 1 \text{ when } \lfloor r_{PUUCH} / 8 \rfloor = 0;$$

and/or determine that the PRB indexes of the target PUCCH resource in the first hop unit in the initial uplink BWP range from $$N_{PRB}^{start}(1, 1) \text{ to } N_{PRB}^{start}(1, 1) + N_{RB} - 1$$

and determine, that the PRB indexes of the target PUCCH resource in the second hop unit in the initial uplink BWP range from $$N_{PRB}^{start}(1, 2) \text{ to } N_{PRB}^{start}(1, 2) + N_{RB} - 1 \text{ when } \lfloor r_{PUUCH} / 8 \rfloor = 1;$$

wherein $N_{RB}$ is the number of PRBs in the target PUCCH resource, $r_{PUUCH}$ is the index of the target PUCCH resource, $$N_{PRB}^{start}(0, 1)$$

is the first PRB index when $$\lfloor r_{PUUCH} / 8 \rfloor = 0, N_{PRB}^{start}(0, 2)$$

is the second PRB index when $$\lfloor r_{PUUCH} / 8 \rfloor = 0, N_{PRB}^{start}(1, 1)$$

is the first PRB index when $$\lfloor r_{PUUCH} / 8 \rfloor = 1, N_{PRB}^{start}(1, 2)$$

is the second PRB index when $\lfloor r_{PUUCH} / 8 \rfloor = 1$, and $\lfloor \rfloor$ represents a floor function.

15. The terminal device of claim 13, wherein:

the first PRB index is a starting PRB index in all PRB indexes of the target PUCCH resource in the first hop unit, or, the first PRB index is a last PRB index in all the PRB indexes of the target PUCCH resource in the first hop unit, or, the first PRB index is an intermediate PRB index in all the PRB indexes of the target PUCCH resource in the first hop unit; and/or the second PRB index is a first PRB index in all PRB indexes of the target PUCCH resource in the second hop unit, or, the second PRB index is a last PRB index in all the PRB indexes of the target PUCCH resource in the second hop unit, or, the second PRB index is an intermediate PRB index in all the PRB indexes of the target PUCCH resource in the second hop unit.

16. The terminal device of claim 13, wherein the computer program executed by the processor to cause the terminal device to determine the first PRB index of the target PUCCH resource in the first hop unit and the second PRB index of the target PUCCH resource in the second hop unit is executed by the processor to cause the terminal device to:

determine the first PRB index as $$N_{RB} * \left( RB_{BWP}^{offset} + \lfloor r_{PUUCH} / (N_{CS}) \rfloor \right)$$

and determine the second PRB index as $$N_{BWP}^{size} - N_{RB} * \left( RB_{BWP}^{offset} + \lfloor r_{PUUCH} / (N_{CS}) \rfloor + 1 \right) \text{ when } \lfloor r_{PUUCH} / 8 \rfloor = 0;$$

and/or determine the first PRB index as $$N_{BWP}^{size} - N_{RB} * \left(RB_{BWP}^{offset} + \lfloor (r_{PUUCH} - 8)/(N_{CS}) \rfloor + 1\right)$$

and determine the second PRB index as $$N_{RB} * \left(RB_{BWP}^{offset} + \lfloor (r_{PUUCH} - 8)/(N_{CS}) \rfloor\right) \text{ when } \lfloor r_{PUUCH}/8 \rfloor = 1;$$

wherein $N_{RB}$ is the number of PRBs in the target PUCCH resource, $r_{PUUCH}$ is the index of the target PUCCH resource, $$RB_{BWP}^{offset}$$

is the PRB offset for the initial uplink BWP, $$N_{BWP}^{size}$$

is the number of PRBs in the initial uplink BWP, $N_{CS}$ is the number of initial CS indexes in the set of initial CS indexes, and $\lfloor \ \rfloor$ represents a floor function.

17. The terminal device of claim 13, wherein the computer program is further executed by the terminal device to cause the terminal device to determine the target PUCCH resource from M PUCCH resources in a target PUCCH resource set, wherein M is a positive integer and M≤K, and K is a number of PUCCH resources in the target PUCCH resource set as defined in a protocol.

18. The terminal device of claim 17, wherein the computer program is further executed by the terminal device to cause the terminal device to determine the M PUCCH resources in the target PUCCH resource set according to at least one of: a number of PRBs in the target PUCCH resource, a PRB offset for the initial uplink BWP, a number of PRBs in the initial uplink BWP, or a number of initial CS indexes in a set of initial CS indexes.

* * * * *